United States Patent
Yasumura

(10) Patent No.: US 6,731,521 B2
(45) Date of Patent: May 4, 2004

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/313,661

(22) Filed: Dec. 6, 2002

(65) Prior Publication Data

US 2003/0198062 A1 Oct. 23, 2003

(30) Foreign Application Priority Data

Dec. 11, 2001 (JP) .................................... P2001-377520
Feb. 12, 2002 (JP) .................................... P2002-033576

(51) Int. Cl.[7] .......................................... H02M 3/335
(52) U.S. Cl. ..................................... 363/21.03
(58) Field of Search ............... 363/21.02, 21, 363/3, 21.07, 21.15, 97

(56) References Cited

U.S. PATENT DOCUMENTS 4,121,282 A * 10/1978 Ohsawa ................ 363/21.08
5,331,534 A * 7/1994 Suzuki et al. .............. 363/20
6,310,786 B1 * 10/2001 Yasumura ................ 363/21.03
6,341,075 B2 * 1/2002 Yasumura ................ 363/21.02
6,388,902 B1 * 5/2002 Yasumura ................ 363/21.02
6,452,817 B1 * 9/2002 Yasumura ................ 363/21.03
6,496,389 B1 * 12/2002 Yasumura ................ 363/21.04
6,590,787 B2 * 7/2003 Yasumura ................ 363/21.03
6,639,813 B2 * 10/2003 Yamagishi et al. ...... 363/21.12

* cited by examiner

Primary Examiner—Adolf Bethane
(74) Attorney, Agent, or Firm—Jay H. Maioli

(57) ABSTRACT

A circuit that includes a combination of a current resonance type converter of a switching frequency controlling system with a partial-voltage resonance circuit is configured such that, in order to improve the power factor where the load power is 150 W or more and the circuit employs an input double-voltage rectification system, a series resonance capacitor or inductor is connected in series to a tertiary winding wound on the primary side of an isolation converter transformer, so that the voltage is fed back to a rectification circuit composed of a high-speed recovery type diode.

9 Claims, 13 Drawing Sheets

SWITCHING POWER SUPPLY CIRCUIT

BACKGROUND OF THE INVENTION

This invention relates to a switching power supply circuit which includes a circuit for improving the power factor.

Various power supply circuits wherein a resonance type converter is provided on the primary side have been proposed by the assignee of the present patent application.

FIG. 9 shows an example of a switching power supply circuit including a configuration for improving the power factor which is one of switching power supply circuits proposed by the assignee of the present patent application. The switching power supply circuit is suitable for conditions of the load power Po=200 W or more and the ac input voltage VAC=200 V type or conditions of the load power Po=150 W or less and the ac input voltage VAC=100 V type.

Referring to FIG. 9, the power supply circuit shown includes a common mode choke coil CMC and a filter capacitor CL connected in such a manner as seen in FIG. 9 to a commercial ac power supply AC to form a filter for removing harmonics superposed on the commercial ac power supply AC.

A power choke coil PCH is inserted in series in one of a pair of lines of the commercial ac power supply AC. The power factor PF is improved to approximately 0.75 by the power choke coil PCH.

A full-wave rectification circuit including a bridge rectification circuit Di and a smoothing capacitor Ci connected in such a manner as shown in FIG. 9 is formed for the commercial ac power supply AC. The full-wave rectification circuit rectifies and smoothes the commercial ac power supply AC to produce a rectified smoothed voltage Ei which appears across the smoothing capacitor Ci. The rectified smoothed voltage Ei has a level equal to the ac input voltage VAC and is inputted as a dc input voltage to a primary side switching converter of the following stage.

In this instance, a current resonance type separately excited converter is used as the switching converter which performs a switching operation with the above-mentioned dc input voltage inputted thereto. The current resonance type converter includes two switching elements Q1 and Q2 as seen in FIG. 9.

In this instance, the switching elements Q1 and Q2 are formed from MOS-FETs and connected in such a manner as seen in FIG. 9 to form a switching circuit of the half bridge coupling type.

Clamp diodes DD1 and DD2 are connected in such directions as seen in FIG. 9 in parallel to the switching elements Q1 and Q2, respectively.

A partial resonance capacitor Cp for partial voltage resonance is connected to the switching element Q2 from between the switching elements Q1 and Q2.

An isolation converter transformer PIT is provided to transmit a switching output of the primary side switching converter to the secondary side.

The isolation converter transformer PIT includes, for example, an EE type core shown in FIG. 13. A primary winding N1 and a secondary winding N2 are wound on a central magnetic leg of the EE type core of the isolation converter transformer PIT using a bobbin or the like such that an isolation condition from each other may be assured.

The central magnetic leg of the EE type core has a gap of, for example, approximately 1.5 mm to 2.0 mm formed therein so that a loose coupling state wherein the coupling coefficient k is approximately k=0.8 may be obtained between the primary winding N1 and the secondary winding N2. This prevents occurrence of abnormal vibrations when an intermediate load is applied.

The primary winding N1 of the isolation converter transformer PIT is connected at one end thereof to the drain of the switching element Q1 and at the other end thereof to a source-drain node of the switching elements Q1 and Q2 through a series resonance capacitor C1. Through the connection just described, a switching output of the switching elements Q1 and Q2 is transmitted to the primary winding N1.

In the connection scheme described, the primary winding N1 and the series resonance capacitor C1 are connected in series, and thus, a primary side series resonance circuit is formed from the leakage inductance of the primary winding N1 and the capacitance of the series resonance capacitor C1. The primary side series resonance circuit makes the switching operation of the switching elements Q1 and Q2 a switching operation of the current resonance type.

A full-wave rectification circuit formed from a bridge rectification circuit DBR and a smoothing capacitor C0 is connected to the secondary winding N2 of the isolation converter transformer PIT. A secondary side dc output voltage E0 is obtained across the smoothing capacitor C0 by the full-wave rectification circuit. The secondary side dc output voltage E0 is supplied to a load not shown. Further, the secondary side dc output voltage E0 is branched and supplied as a detection voltage also to an oscillation drive/control circuit 2.

The oscillation drive/control circuit 2 may be formed typically from an IC for universal use and is provided to drive the switching elements Q1 and Q2 in accordance with separate excitation system to perform a switching operation.

Driving signals (voltages) are outputted from the oscillation drive/control circuit 2 to the gates of the switching elements Q1 and Q2 so that the switching elements Q1 and Q2 perform switching on/off alternately with a required switching frequency.

The oscillation drive/control circuit 2 operates to vary the frequency of the driving signals in response to the level of the secondary side dc output voltage E0 inputted thereto. Consequently, the switching elements Q1 and Q2 are controlled so as to vary the switching frequency in response to the level of the secondary side dc output voltage E0.

When the switching frequency varies in this manner, the resonance impedance of the primary side dc resonance circuit varies, and also the energy to be transmitted from the primary side to the secondary side in the isolation converter transformer PIT varies. Therefore, also the level of the secondary side dc output voltage E0 is variably controlled. In other words, the secondary side dc output voltage E0 is varied by variably controlling the switching frequency thereby to achieve constant voltage control.

The power supply circuit shown in FIG. 9 is suitable for conditions of the load power Po=200 W or more and the ac input voltage VAC=200 V type or conditions of the load power Po=150 W or less and the ac input voltage VAC=100 V type. In contrast, in order to satisfy conditions of the load power Po=200 W or more and the ac input voltage VAC=100 V type, the rectification circuit system for rectifying the commercial ac power supply AC to obtain the rectified smoothed voltage Ei (dc input voltage), the power supply circuit shown in FIG. 9 is modified in such a manner as seen in FIG. 10, in which like reference characters to those of FIG. 9 denote like elements.

Referring to FIG. 10, the power supply circuit shown includes, as a rectification circuit system for rectifying the commercial ac power supply AC, two rectification diodes D13 and D14 and two smoothing capacitors Ci1 and Ci2. The elements mentioned are connected in such a manner as seen in FIG. 10 so that the rectified smoothed voltage Ei (dc input voltage) obtained across the smoothing capacitors Ci1 and Ci2 connected in series has a level equal to twice that of the ac input voltage VAC. In other words, the rectification circuit system is formed as a double voltage rectification circuit.

It is known that, for example, where the dc input voltage is equal to twice the ac input voltage VAC in a comparatively low load condition that the load power Po is Po=200 W or more where the ac input voltage VAC is 100 V type, the peak current flowing through the switching elements in the succeeding stage increases and the power loss increases as much. Therefore, if the dc input voltage of the level equal to twice that of the ac input voltage VAC is obtained by the double voltage rectification circuit shown in FIG. 10, then the level of the peak current to flow through the switching circuits can be suppressed.

FIG. 11 shows a further power supply circuit which includes a power factor improving circuit for improving the power factor for a voltage resonance type self-excited switching converter.

The power supply circuit is configured such that a power factor improving rectification circuit 20 for improving the power factor is provided for a converter circuit which includes a combination of a half bridge coupling current resonance type converter and a partial voltage resonance circuit with which voltage resonance occurs only upon turning off of a semiconductor switch.

In the power supply circuit shown in FIG. 11, ac input current IAC is rectified by the power factor improving rectification circuit 20 (described later) and smoothed by the two smoothing capacitors Ci1 and Ci2 connected in series so that a rectified smoothed voltage Ei by a double voltage rectification system equal to twice that obtained by the full-wave rectification system is obtained.

The power supply circuit further includes a self-excited current resonance type converter which uses, as a power supply for operation, the rectified smoothed voltage Ei which appears across the smoothing capacitors Ci1 and Ci2.

In the current resonance type converter, two switching elements Q1 and Q2 each in the form of a bipolar transistor are half-bridge coupled as seen in FIG. 11 and inserted between the positive electrode side of the smoothing capacitor Ci1 and the primary side ground.

Starting resistors RS1 and RS2 are inserted between the collector and the base of the switching elements Q1 and Q2, respectively. Resistors RB1 and RB2 are connected to the bases of the switching elements Q1 and Q2 and set base current (drive current) of the switching elements Q1 and Q2, respectively.

Clamp diodes DD1 and DD2 are inserted between the base and the emitter of the switching elements Q1 and Q2, respectively. The clamp diodes DD1 and DD2 form current paths for clamp current which flows between the base and the emitter within periods within which the switching elements Q1 and Q2 are off, respectively.

Resonance capacitors CB1 and CB2 cooperate with driving windings NB1 and NB2 of a drive transformer PRT described below to form a series resonance circuit for self-excited oscillation (self-excited oscillation drive circuit) and determine the switching frequency of the switching elements Q1 and Q2.

The drive transformer PRT (Power Regulating Transformer) drives the switching elements Q1 and Q2 and variably controls the switching frequency to perform constant voltage control. In the circuit shown in FIG. 11, the driving windings NB1 and NB2 on the drive transformer PRT are wound while a control winding NC is wound in an orthogonal direction to that of the driving windings NB1 and NB2 thereby to form an orthogonal saturable reactor.

One end of the driving winding NB1 of the drive transformer PRT is connected to the base of the switching element Q1 through a series connection of the resistor RB1 and the resonance capacitor CB1. The other end of the driving winding NB1 forms a tap point connected to a resonance current detection winding ND and is connected to the emitter of the switching element Q1.

One end of the driving winding NB2 is grounded, and the other end of the driving winding NB2 is connected to the base of the switching element Q2 through a series connection of the resistor RB2 and the resonance capacitor CB2.

The driving winding NB1 and the driving winding NB2 are wound such that they generate voltages of the opposite polarities to each other.

The isolation converter transformer PIT (Power Isolation Transformer) transmits switching outputs of the switching elements Q1 and Q2 to the secondary side.

In the isolation converter transformer PIT, a gap is formed in a central magnetic leg of an EE type core similarly as in FIG. 13, and the primary winding N1 and the secondary winding N2 are wound in an isolated relationship from each other using a bobbin.

One end of the primary winding N1 of the isolation converter transformer PIT is connected to a node (switching output point) between the emitter of the switching element Q1 and the collector of the switching element Q2 through the resonance current detection winding ND so that a switching output can be obtained therefrom.

The other end of the primary winding N1 is connected to a node between high speed recovery type diodes D1 and D2 in the power factor improving rectification circuit 20 through the series resonance capacitor C1.

In this instance, the series resonance capacitor C1 and the primary winding N1 are connected in series, and a primary side current resonance circuit for making operation of the switching converter operation of the current resonance type is formed from a capacitance of the series resonance capacitor C1 and a leakage inductance component L1 of the isolation converter transformer PIT including the primary winding N1 (series resonance winding).

A parallel resonance capacitor Cp is connected in parallel between the collector and the emitter of the switching element Q2.

Through the connection of the parallel resonance capacitor Cp, a voltage resonance operation is obtained only upon turning off of the switching elements Q1 and Q2 by the capacitance of the parallel resonance capacitor Cp and the leakage inductance component L1 of the primary winding N1. In short, a partial voltage resonance circuit is formed.

On the secondary side of the isolation converter transformer PIT shown in FIG. 11, a center tap is provided for the secondary winding N2 and rectification diodes D01, D02, D03 and D04 and smoothing capacitors C01 and C02 are connected in such a manner as seen in FIG. 11 to form two full-wave rectification circuits including a full-wave rectification circuit of the rectification diodes D01 and D02 and the smoothing capacitor C01 and another full-wave rectification circuit of the rectification diodes D03 and D04 and the smoothing capacitor C02. The full-wave rectification circuit including the rectification diodes D01 and D02 and the smoothing capacitor C01 produces a dc output voltage E01 while the full-wave rectification circuit including the rectification diodes D03 and D04 and the smoothing capacitor C02 produces another dc output voltage E02.

It is to be noted that, in this instance, the dc output voltage E01 and the dc output voltage E02 are branched and inputted also to a control circuit 1. The control circuit 1 utilizes the dc output voltage E01 as a detection voltage and uses the dc output voltage E02 as a power supply for operation of the control circuit 1.

The control circuit 1 supplies dc current, whose level is varied, for example, in response to the level of the dc output voltage E01 of the secondary side, as control current to the control winding NC of the drive transformer PRT to perform constant voltage control.

The power supply circuit having the configuration described above performs a switching operation in the following manner. First, when a commercial ac power supply is made available, starting current is supplied to the bases of the switching elements Q1 and Q2, for example, through the starting resistors RS1 and RS2, respectively. If, for example, the switching element Q1 is turned on first, then the switching element Q2 is controlled so as to be turned off. Thus, as an output of the switching element Q1, resonance current flows along the resonance current detection winding ND→primary winding N1→series resonance capacitor C1, and the switching elements Q1 and Q2 are controlled so that, when the resonance current exhibits a value in the proximity of 0, the switching element Q2 is turned on while the switching element Q1 is turned off. Then, resonance current flows through the switching element Q2 now in the opposite direction. Thereafter, a self-excited switching operation wherein the switching elements Q1 and Q2 are turned on alternately is repeated.

When the switching elements Q1 and Q2 repeat opening and closing operations alternately using the terminal voltage of the smoothing capacitors Ci1 and Ci2 as a power supply for operation in this manner, drive current having a waveform proximate to a resonance current waveform is supplied to the primary winding N1 of the isolation converter transformer PIT thereby to obtain an alternating output at the secondary winding N2.

As described above, the control circuit 1 supplies the dc current, whose level is varied, for example, in response to the level of the dc output voltage E01 on the secondary side, as control current to the control winding NC of the drive transformer PRT to perform constant voltage control.

In particular, the control current corresponding to the level of the dc output voltage E01 is supplied to the control winding NC to vary the inductance values of the driving windings NB1 and NB2 thereby to vary the conditions of the self-excited oscillation circuit to control the switching frequency. Consequently, the switching frequency of the switching elements Q1 and Q2 is varied in response to the level of the dc output voltage E01 thereby to control the drive current to be supplied to the primary winding N1 of the primary side series resonance circuit to control the energy to be transmitted to the secondary side to achieve constant voltage control of the secondary side dc output voltage.

It is to be noted that the constant voltage control method according such a method as described above is hereinafter referred to as "switching frequency control method".

Now, a configuration of the power factor improving rectification circuit 20 is described.

The power factor improving rectification circuit 20 has a power factor improving circuit configuration of the electrostatic coupling type power feedback type.

The power factor improving rectification circuit 20 has a rectification action for ac input current IAC and has a power factor improving action for the ac input current IAC.

In the power factor improving rectification circuit 20, a film capacitor is disposed as a capacitor CN for normal mode noise suppression between ac lines.

Further, the two high speed recovery type diodes D1 and D2 are provided through a choke coil (inductor L10).

The high speed recovery type diodes D1 and D2 are connected in series and disposed between the positive terminal of the smoothing capacitor Ci1 and the primary side ground.

The primary winding N1 of the isolation converter transformer PIT is connected to a node between the high speed recovery type diodes D1 and D2 through the series resonance capacitor C1.

Further, capacitors C21 and C22 are provided. The capacitor C22 is connected in parallel to the high speed recovery type diode D1 while the capacitor C21 is connected in parallel to the high speed recovery type diode D2.

In the power factor improving rectification circuit 20 having the configuration described above, the high speed recovery type diodes D1 and D2 function as a rectification circuit.

Within a period within which the ac input voltage VAC is positive, rectified current flows along the ac power supply AC→inductor L10→high speed recovery type diode D1→smoothing capacitor Ci1→..., whereby the smoothing capacitor Ci1 is charged.

Within another period within which the ac input voltage VAC is negative, rectified current flows along the ac power supply AC→inductor L10→smoothing capacitor Ci2→primary side ground→high speed recovery type diode D2→..., whereby the smoothing capacitor Ci2 is charged.

The smoothing capacitors Ci1 and Ci2 are connected in series and a rectified smoothed voltage Ei is extracted from the positive terminal side of the smoothing capacitor Ci1, thereby achieving the double voltage rectification system.

The power factor improving rectification circuit 20 has the following power factor improving function.

As described above, the current resonance circuit formed from the series resonance capacitor C1 and the primary winding N1 is connected to the node between the two high speed recovery type diodes D1 and D2. Further, the inductor L10 and capacitors C21 and C22 are connected to the node between the high speed recovery type diodes D1 and D2.

In this instance, by power feedback wherein primary side series resonance current is regenerated to the smoothing capacitors Ci1 and Ci2 through the inductor L10 and capacitors C21 and C22, the high speed recovery type diodes D1 and D2 perform a switching operation when the absolute value of the ac input voltage VAC is higher than ½ of its peak value.

Consequently, also within a period within which the rectified output voltage level is lower than the voltage across the smoothing capacitor Ci1 (or Ci2), charging current flows to the smoothing capacitor Ci1 (or Ci2).

As a result, an average waveform of the ac input current approaches the waveform of the ac input voltage and increases the continuity angle of the ac input current, and consequently, improvement of the power factor is achieved.

FIG. 12 illustrates, as a characteristic of the power supply circuit shown in FIG. 11, variations of the AC to DC power conversion efficiency (ηAC/DC), power factor PF and rectified smoothed voltage Ei with respect to a load variation where the power supply circuit is configured for the conditions of the load power Po=200 W and the ac input voltage VAC=100 V.

It is to be noted that a power choke coil PCH (L11) is inserted in one of the ac power supply lines and the value of the inductance L11 of the power choke coil PCH is set so that the power factor PF may exhibit a value of 0.75 when the load power Po is in the maximum as indicated by a solid line in FIG. 12.

Also the power supply circuit just described has the following problems.

Since the power choke coil PCH involves iron loss and copper loss and therefore exhibits some increased power loss and some drop of the dc input voltage, there is a problem that the AC to DC power conversion efficiency ηAC/DC drops.

Where the load power Po is Po=200 W, the inductance L11 of the power choke coil PCH is 4.4 mH and the power factor PF is PF=0.76, and a harmonic distortion regulation value is cleared. However, when compared with that of another case wherein the power choke coil PCH is not connected as indicated by a broken line in FIG. 12, due to power loss of the power choke coil PCH and a drop of the rectified smoothed voltage Ei to 13.5 V, the AC to DC power conversion efficiency ηAC/DC drops by 0.3% and the ac input power increases by 0.6 W.

Further, as the load power increases, the scale of the power choke coil PCH increases, resulting in increase of the weight, size and cost.

For example, the necessary weight of the power choke coil PCH is approximately 240 g, and the volume occupation is 48 cm$^3$ and the mounting area on a printed circuit board is 19.2 cm$^2$.

Further, the location of the power choke coil PCH must be selected so that leakage magnetic fluxes therefrom may not have a bad influence on any other element, or a countermeasure which prevents an influence of such leakage magnetic fluxes is required.

Accordingly, the location of the power choke coil PCH on a circuit board is restricted.

SUMMARY OF THE INVENTION

It is an object of the present invention to provide a switching power supply circuit which is improved in the power factor and the power conversion efficiency and reduced in size and weight.

In order to attain the object described above, according to an aspect of the present invention, there is provided a switching power supply circuit comprising:

rectification smoothing means including a rectifier and a smoothing capacitor connected in series for rectifying and smoothing an ac voltage supplied through two lines for an ac power supply;

an isolation converter transformer including a core and a primary winding, a secondary winding and tertiary winding wound on the core for transmitting an output on a primary side obtained by the primary winding to a secondary side wherein the secondary winding is wound, the tertiary winding being provided on the primary side;

switching means including two switching elements coupled in a half-bridge coupling for intermittently outputting an output voltage of the smoothing means to the primary winding of the isolation converter transformer;

switching driving means for driving the switching elements to perform a switching operation;

a current resonance circuit formed from a leakage inductance component of the primary winding of the isolation converter transformer and a capacitance of a series resonance capacitor connected in series to the primary winding for making the operation of the switching means operation of the current resonance type;

a partial voltage resonance circuit formed from a capacitance of a parallel resonance capacitor connected in parallel to one of the switching elements and a leakage inductance component of the primary winding of the isolation converter transformer for performing a voltage resonance operation within a turnoff period of each of the switching elements; and dc output voltage production means for receiving and rectifying an alternating voltage obtained by the secondary winding of the isolation converter transformer to produce a secondary side dc output voltage, wherein the tertiary winding is connected between one of the two lines for the ac power supply and the smoothing capacitor.

According to another aspect of the present invention, there is provided a switching power supply circuit comprising:

a rectification smoothing circuit including a voltage rectifier for rectifying ac current and a smoothing capacitor for smoothing the rectified current from the voltage rectifier;

an isolation converter transformer including a core and a primary winding, a secondary winding and tertiary winding wound on the core for transmitting an output on a primary side obtained by the primary winding to a secondary side wherein the secondary winding is wound;

switching means including two switching elements coupled in a half-bridge coupling for intermittently outputting an output voltage of the rectification smoothing circuit to the primary winding of the isolation converter transformer;

switching driving means for driving the switching elements to perform a switching operation;

a primary side series resonance circuit formed from a leakage inductance component of the primary winding of the isolation converter transformer and a capacitance of a primary side series resonance capacitor connected in series to the primary winding for making the operation of the switching means operation of the resonance type;

a partial voltage resonance circuit formed from a capacitance of a primary side partial resonance capacitor connected in parallel to one of the switching elements and a leakage inductance component of the primary winding of the isolation converter transformer for performing a voltage resonance operation within a turnoff period of each of the switching elements;

a power factor improving circuit including a first high speed recovery type diode element connected between the voltage rectifier and the smoothing capacitor, a series connection circuit of the tertiary winding and a second high speed recovery type diode element connected in parallel with the first high speed recovery type diode element; and dc output voltage production means for receiving and rectifying an alternating voltage obtained by the secondary winding of the isolation converter transformer to produce a secondary side dc output voltage.

With the switching power supply circuits, improvement of the power factor of a circuit which includes a combination of a current resonance type converter of a switching frequency controlling system with a partial voltage resonance circuit where the load power is 150 W or more and the circuit employs an input double voltage rectification system is achieved by connecting a series resonance capacitor or inductor in series to a tertiary winding wound on the primary side of an isolation converter transformer so that the voltage is fed back to a rectification circuit composed of a high speed recovery type diode. Consequently, improvement of the power factor, improvement of the power conversion efficiency and reduction in size and weight are achieved.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

First Embodiment

Figure 1:
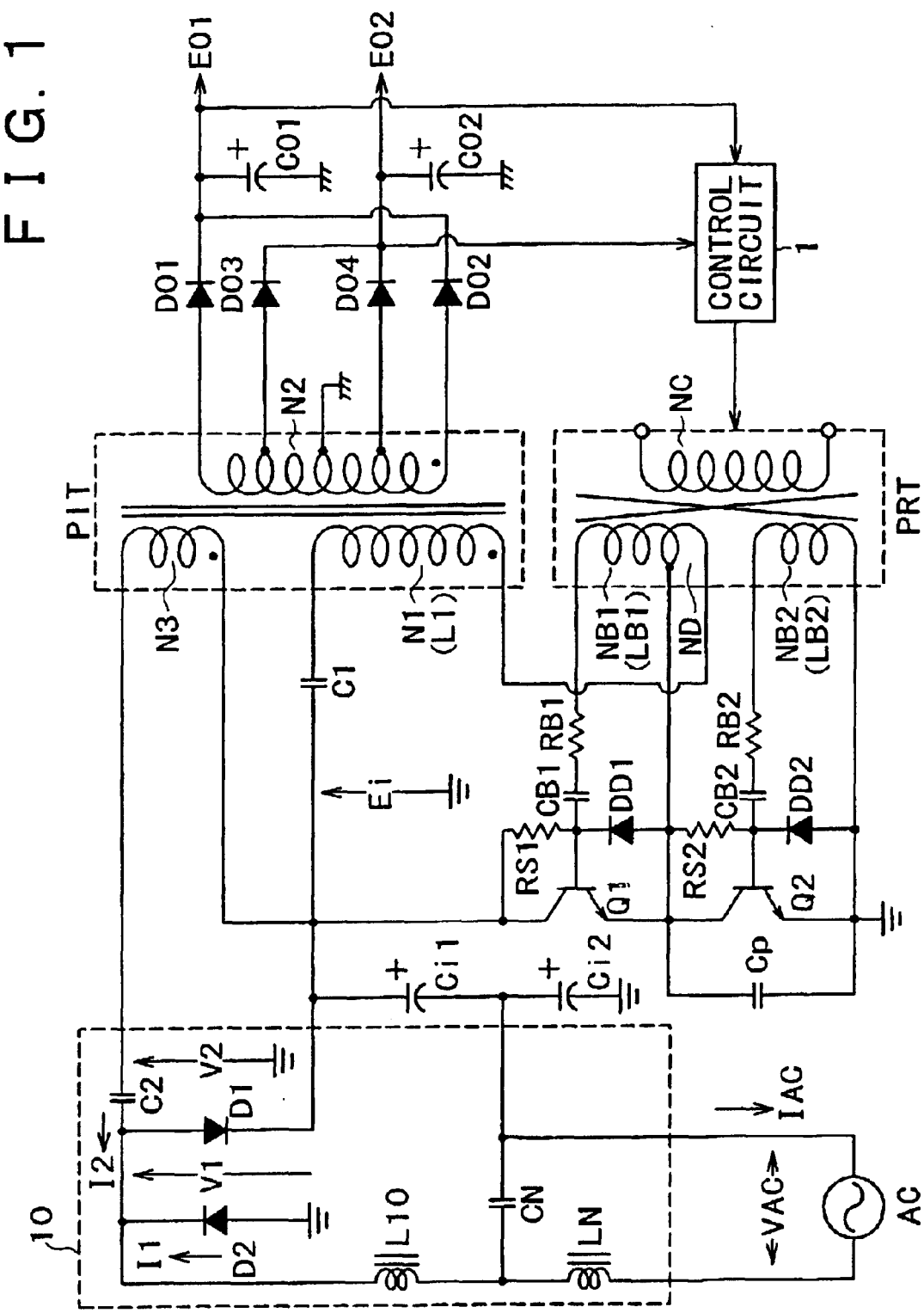
FIG. 1 is a circuit diagram showing a configuration of a switching power supply circuit of a first embodiment, according to the present invention.

Referring to FIG. 1, there is shown a configuration of a switching power supply circuit of a first embodiment according to the present invention.

The power supply circuit of FIG. 1 is generally configured such that a power factor improving rectification circuit 10 for improving the power factor is provided for a converter circuit which includes a combination of a half bridge coupling current resonance type converter and a partial voltage resonance circuit which exhibits voltage resonance only upon turning off of a semiconductor switch.

In the power supply circuit shown in FIG. 1, ac input current IAC is rectified by the power factor improving rectification circuit 10 and smoothed by two smoothing capacitors Ci1 and Ci2 connected in series so that a rectified smoothed voltage Ei equal to twice that obtained by the full-wave rectification system is obtained by the double voltage rectification system.

The power factor improving rectification circuit 10 is hereinafter described.

The power supply circuit includes a self-excited current resonance type converter which uses the rectified smoothed voltage Ei, which is a voltage across the smoothing capacitors Ci1 and Ci2, as a power supply for operation.

In the current resonance type converter, two switching elements Q1 and Q2 each in the form of a bipolar transistor are coupled in a half bridge connection as seen in FIG. 1 and interposed between the positive electrode side of the smoothing capacitor Ci1 and the primary side ground.

Starting resistors RS1 and RS2 are inserted between the collector and the base of the switching elements Q1 and Q2, respectively. Further, resistors RB1 and RB2 are connected to the bases of the switching elements Q1 and Q2 and set the base current (drive current) for the switching elements Q1 and Q2.

Clamp diodes DD1 and DD2 are inserted between the base and the emitter of the switching elements Q1 and Q2, respectively. The clamp diodes DD1 and DD2 form current paths for clamp current which flows between the base and the emitter of the switching elements Q1 and Q2, respectively, when the switching elements Q1 and Q2 are off.

Resonance capacitors CB1 and CB2 cooperate with driving windings NB1 and NB2 of a drive transformer PRT to form a series resonance circuit for self-excited oscillation (self-excited oscillation drive circuit) and determine the switching frequency of the switching elements Q1 and Q2.

The drive transformer PRT (Power Regulating Transformer) is provided to drive the switching elements Q1 and Q2 and variably control the switching frequency to perform constant voltage control. In the arrangement shown in FIG. 1, the drive transformer PRT is formed as an orthogonal saturable reactor wherein the driving windings NB1 and NB2 are wound and a control winding NC is wound in a direction orthogonal to that of the driving windings NB1 and NB2.

One end of the driving winding NB1 of the drive transformer PRT is connected to the base of the switching element Q1 through a series connection of the resistor RB1 and the resonance capacitor CB1. The other end of the driving winding NB1 is formed as a tap point, connected to a resonance current detection winding ND and is connected to the emitter of the switching element Q1.

Meanwhile, one end of the driving winding NB2 is grounded, and the other end of the driving winding NB2 is connected to the base of the switching element Q2 through a series connection of the resistor RB2 and the resonance capacitor CB2.

The driving winding NB1 and the driving winding NB2 are wound such that voltages having polarities opposite to each other are generated thereby.

An isolation converter transformer PIT (Power Isolation Transformer) transmits a switching output of the switching elements Q1 and Q2 to the secondary side.

Figure 13:
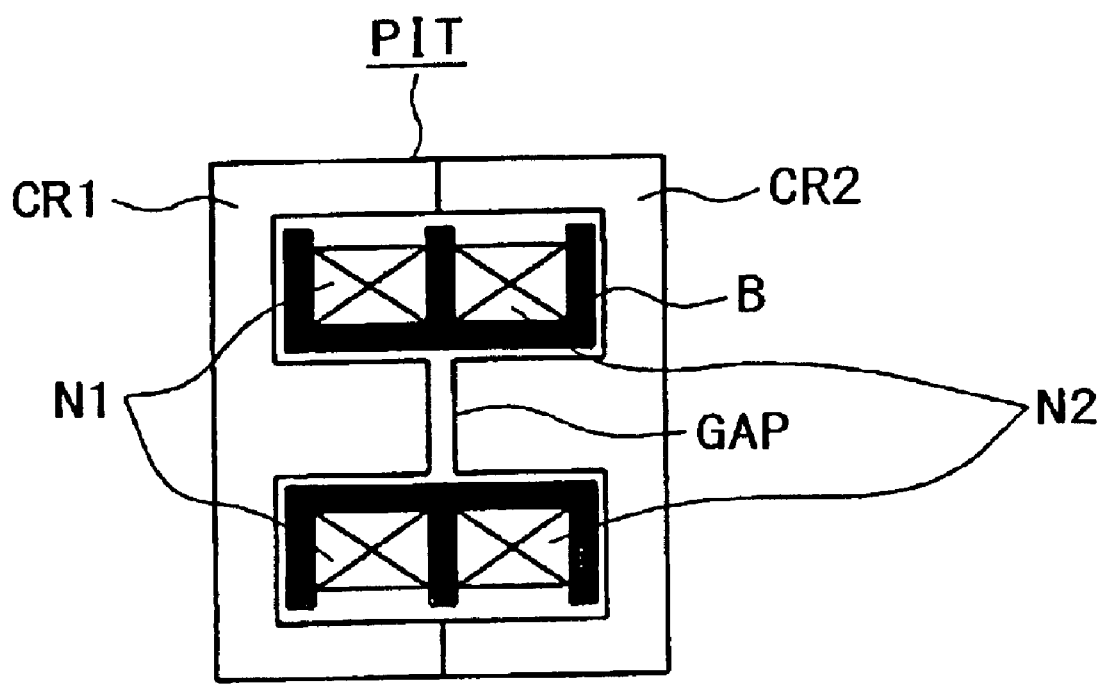
FIG. 13 is a schematic view showing a structure of an EE type core which can be used in the related-art power supply circuits shown in FIGS. 9 to 11.

The isolation converter transformer PIT includes an EE type core having a central magnetic leg in which a gap is formed, and a primary winding and a secondary winding wound in an isolated state from each other on the central magnetic leg of the EE type core using a bobbin similarly as in FIG. 13.

A winding starting end of a primary winding N1 of the isolation converter transformer PIT is connected to a node (switching output point) between the emitter of the switching element Q1 and the collector of the switching element Q2 through the resonance current detection winding ND so that a switching output is obtained therefrom.

A winding terminating end of the primary winding N1 is connected to the positive electrode side of the smoothing capacitor Ci1 through a series resonance capacitor C1.

In this instance, the series resonance capacitor C1 and the primary winding N1 are connected in series, and a capacitance of the series resonance capacitor C1 and a leakage inductance component L1 of the isolation converter transformer PIT including the primary winding N1 (series resonance winding) form a primary side current resonance circuit for making operation of the switching converter operation of the current resonance type.

A parallel resonance capacitor Cp is connected in parallel between the collector and the emitter of the switching element Q2.

Through the connection of the parallel resonance capacitor Cp, a voltage resonance operation is obtained only upon turning off of the switching elements Q1 and Q2 by the capacitance of the parallel resonance capacitor Cp and the leakage inductance component L1 of the primary winding N1. In other words, a partial voltage resonance circuit is formed.

A tertiary winding N3 is wound on the primary side of the isolation converter transformer PIT. A winding starting end of the tertiary winding N3 is connected to the positive electrode side of the smoothing capacitor Ci1 while a winding terminating end of the tertiary winding N3 is connected to the node between the high speed recovery type diodes D1 and D2 through a series resonance capacitor C2.

On the secondary side of the isolation converter transformer PIT, a center tap is provided for the secondary winding N2 and rectification diodes D01, D02, D03 and D04 and smoothing capacitors C01 and C02 are connected in such a manner as seen in FIG. 1 to form two full-wave rectification circuits including a full-wave rectification circuit composed of the rectification diodes D01 and D02 and the smoothing capacitor C01 and another full-wave rectification circuit composed of the rectification diodes D03 and D04 and the smoothing capacitor C02. The full-wave rectification circuit composed of the rectification diodes D01 and D02 and the smoothing capacitor C01 produces a dc output voltage E01 while the full-wave rectification circuit composed of the rectification diodes D03 and D04 and the smoothing capacitor C02 produces another dc output voltage E02.

It is to be noted that, in this instance, the dc output voltage E01 and the dc output voltage E02 are branched and inputted also to a control circuit 1. The control circuit 1 uses the dc output voltage E01 as a detection voltage and uses the dc output voltage E02 as a power supply for operation of the control circuit 1 itself.

The control circuit 1 supplies dc current, whose level is varied, for example, in response to the level of the dc output voltage E01 of the secondary side, as control current to the control winding NC of the drive transformer PRT to effect constant voltage control.

The power supply circuit having the configuration described above performs a switching operation in the following manner. First, when a commercial ac power supply is made available, starting current flows to the bases of the switching elements Q1 and Q2, for example, through the starting resistors RS1 and RS2, respectively. Here, if it is assumed that the switching element Q1 is turned on first, then the switching element Q2 is controlled so as to be turned off. Then, as an output of the switching element Q1, resonance current flows along the resonance current detection winding ND→primary winding N1→series resonance capacitor C1. When the resonance current comes to a value proximate to 0, the switching elements Q1 and Q2 are controlled so that the switching element Q2 is turned on and the switching element Q1 is turned off. Then, resonance current flows through the switching element Q2 now in the direction opposite to that described above. Thereafter, a self-excited switching operation wherein the switching elements Q1 and Q2 are turned on alternately is repeated.

Since turning on/off of the switching elements Q1 and Q2 is repeated alternately using the terminal voltage across the smoothing capacitors Ci1 and Ci2 as a power supply for operation, drive current having a waveform proximate to a resonance current waveform is supplied to the primary winding N1 of the isolation converter transformer PIT so that an alternating output is obtained from the secondary winding N2.

As described above, the control circuit 1 supplies the dc current, whose level varies, for example, in response to the level of the dc output voltage E01 of the secondary side, as control current to the control winding NC of the drive transformer PRT to effect constant voltage control.

More particularly, when the control current corresponding to the level of the dc output voltage E01 flows through the control winding NC, the inductance values of the driving windings NB1 and NB2 vary, and consequently, the conditions of the self-excited oscillation circuit are varied to control the switching frequency. Consequently, the switching frequency of the switching elements Q1 and Q2 varies in response to the level of the dc output voltage E01, and the drive current to be supplied to the primary winding N1 of the primary side series resonance circuit is controlled to control the energy to be transmitted to the secondary side. In short, constant voltage control of the secondary side dc output voltage by the switching frequency control is achieved.

Now, a configuration of the power factor improving rectification circuit 10 is described.

The power factor improving rectification circuit 10 has a rectification action for the ac input current IAC and a power factor improving action for the ac input current IAC.

In the power factor improving rectification circuit 10, a filter for normal mode noise suppression is formed from a capacitor CN and an inductor LN for one of ac lines.

A choke coil (inductor L10) is connected in series to the filter for normal mode noise suppression.

Further, two high speed recovery type diodes D1 and D2 connected in series are provided. The series connection of the high speed recovery type diodes D1 and D2 is disposed between the positive terminal of the smoothing capacitor Ci1 and the primary side ground.

The series resonance capacitor C2 is connected in series to the tertiary winding N3 of the isolation converter transformer PIT, and the series resonance capacitor C2 is connected to a node between the high speed recovery type diodes D1 and D2. Also the choke coil (inductor L10) is connected to the node between the high speed recovery type diodes D1 and D2.

The series circuit of the tertiary winding N3 and the series resonance capacitor C2 is connected in parallel to the high speed recovery type diode D1.

In the power factor improving rectification circuit 10, the high speed recovery type diodes D1 and D2 function as a rectification circuit.

In particular, within a period within which the ac input voltage VAC is positive, rectified current flows along the ac power supply AC→filter for normal mode noise suppression (LN, CN)→inductor L10→high speed recovery type diode D1→smoothing capacitor Ci1→. . . , whereby the smoothing capacitor Ci1 is charged.

On the other hand, within another period within which the ac input voltage VAC is negative, rectified current flows along the ac power supply AC→smoothing capacitor Ci2→primary side ground→high speed recovery type diode D2→. . . , whereby the smoothing capacitor Ci2 is charged.

The smoothing capacitors Ci1 and Ci2 are connected in series and a rectified smoothed voltage Ei is extracted from the positive terminal side of the smoothing capacitor Ci1, thereby achieving the double voltage rectification system.

The power factor improving rectification circuit 10 has a power factor improving function described below.

A voltage induced in the tertiary winding N3 is induced based on a switching operation of the primary side current resonance converter and is a pulse voltage of a rectangular waveform which increases in proportion to the winding number ratio (N3/N1) of the tertiary winding N3 to the primary winding N1.

While a series resonance circuit is formed from the inductance of the tertiary winding N3 and the electrostatic capacitance of the series resonance capacitor C2, the series resonance frequency of the series resonance circuit is set so as to be lower than the switching frequency of the resonance converter which includes the current resonance circuit and the partial voltage resonance circuit as described above. In short, the winding number of the tertiary winding N3 and the electrostatic capacitance of the series resonance capacitor C2 are selected so that the series resonance frequency may be lower than the switching frequency.

Within a period within which the induced voltage of the tertiary winding N3 is positive, series resonance current I2 flows along the tertiary winding N3→series resonance capacitor C2→high speed recovery type diode D1 and causes the high speed recovery type diode D1 to perform a switching operation.

Simultaneously, current I1 flows along the capacitor CN→inductor L10→high speed recovery type diode D1→smoothing capacitor Ci1.

On the other hand, within another period within which the induced voltage of the tertiary winding N3 is negative, the series resonance current I2 flows along the tertiary winding N3→smoothing capacitor Ci1→smoothing capacitor Ci2→high speed recovery type diode D2 and causes the high speed recovery type diode D2 to perform a switching operation.

Simultaneously, within the period within which the ac input voltage VAC is negative, the current I1 flows along the capacitor CN→smoothing capacitor Ci2→high speed recovery type diode D2→inductor L10.

Figure 2:
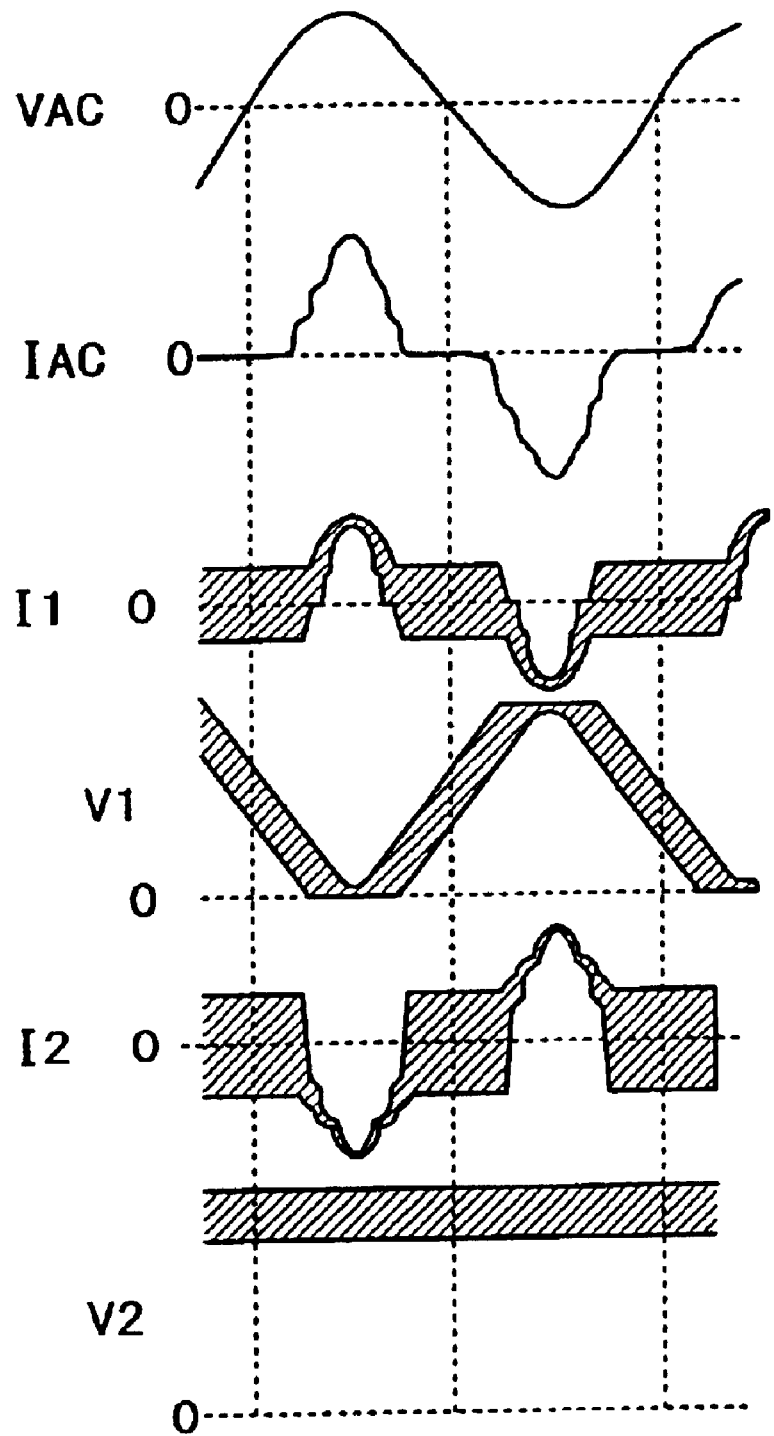
FIG. 2 is a waveform diagram illustrating operation of the switching power supply circuit of the first embodiment.

Such operation waveforms of the currents I1 and I2 are shown together with the ac input voltage VAC and the ac input current IAC in FIG. 2.

Where the series resonance current I2 is used to cause the high speed recovery type diodes D1 and D2 to perform a switching operation when the absolute value of the ac input voltage VAC is higher than ½ of its peak value, charging current to the smoothing capacitor Ci1 (or Ci2) flows even within a period within which the rectification output voltage level is lower than the voltage across the smoothing capacitor Ci1 (or Ci2).

As a result, an average waveform of the ac input current approaches the waveform of the ac input voltage and increases the continuity angle of the ac input current, and consequently, improvement of the power factor is achieved.

Figure 3:
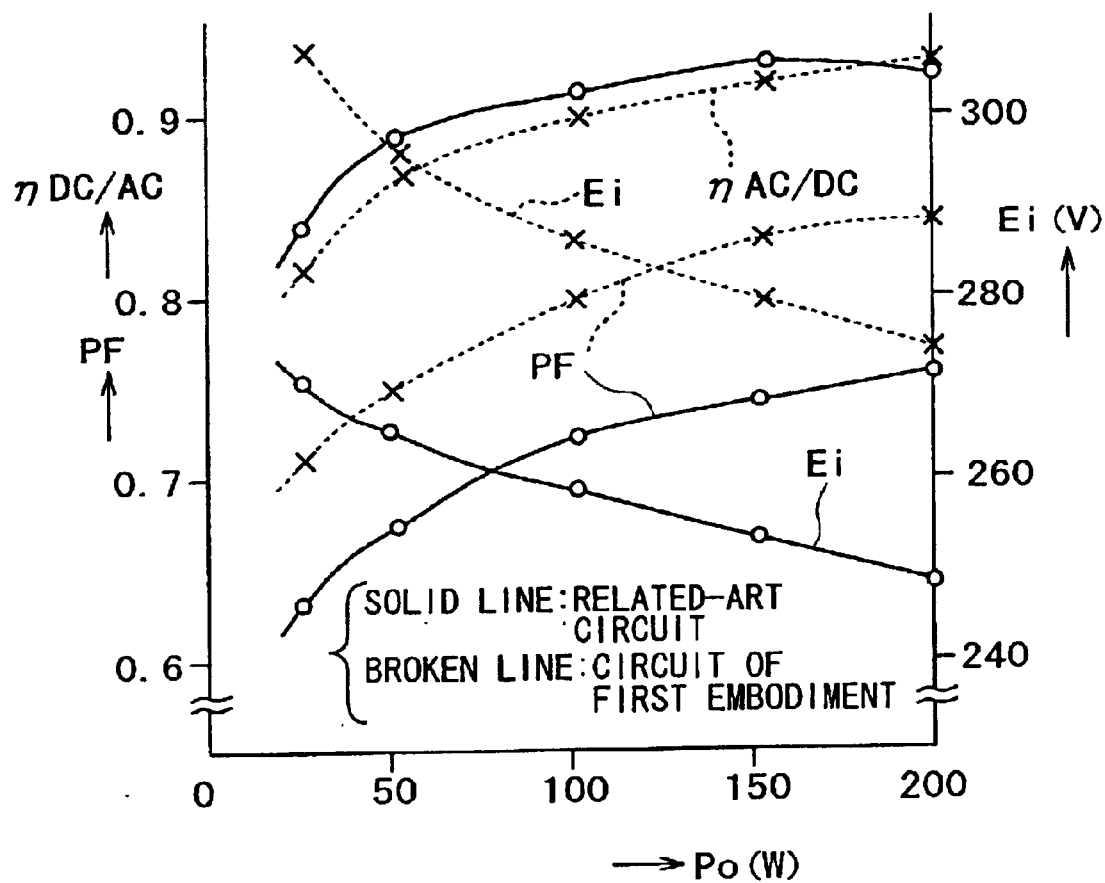
FIG. 3 is a diagram illustrating characteristics of the AC to DC conversion efficiency, power factor and dc input voltage of the switching power supply circuit of the first embodiment.

FIG. 3 illustrates variation characteristics of the AC to DC power conversion efficiency ($\eta$AC/DC), power factor PF and double voltage rectified dc input voltage Ei and particularly illustrates such variations when the ac input voltage VAC is 100 V and the load power Po varies from 200 W to 25 W. It is to be noted that, in FIG. 3, broken line curves represent the characteristics by the circuit of FIG. 1 and solid line curves represent the characteristics by the related-art circuit described hereinabove with reference to FIG. 11 (characteristics in the circuit wherein a power choke coil is interposed in an ac line) for comparison.

It is to be noted that, when the characteristics illustrated in FIG. 3 are obtained, the circuit of FIG. 1 has the following constants:

primary winding N1 of the isolation converter transformer PIT=45 T (turns)

secondary winding N2 of the isolation converter transformer PIT=45 T tertiary winding N3 of the isolation converter transformer PIT=4 T inductor L10=29 $\mu$H series resonance capacitor C1=0.056 $\mu$F series resonance capacitor C2=0.27 $\mu$F As can be seen from FIG. 3, in the circuit of FIG. 1, a power factor PF of 0.83 when the load power Po is 200 W is realized. Further, the power factor obtained exhibits a small variation with respect to a variation of the ac input voltage VAC.

The double voltage rectified dc input voltage Ei exhibits a rise of 24.2 V, and the AC to DC power conversion efficiency ($\eta$AC/DC) exhibits a rise of 0.3% with respect to that of the related art where the load power Po is 200 W. In this instance, the ac input power exhibits a decrease of 0.5 W, and therefore, saving of energy is achieved.

Figure 11:
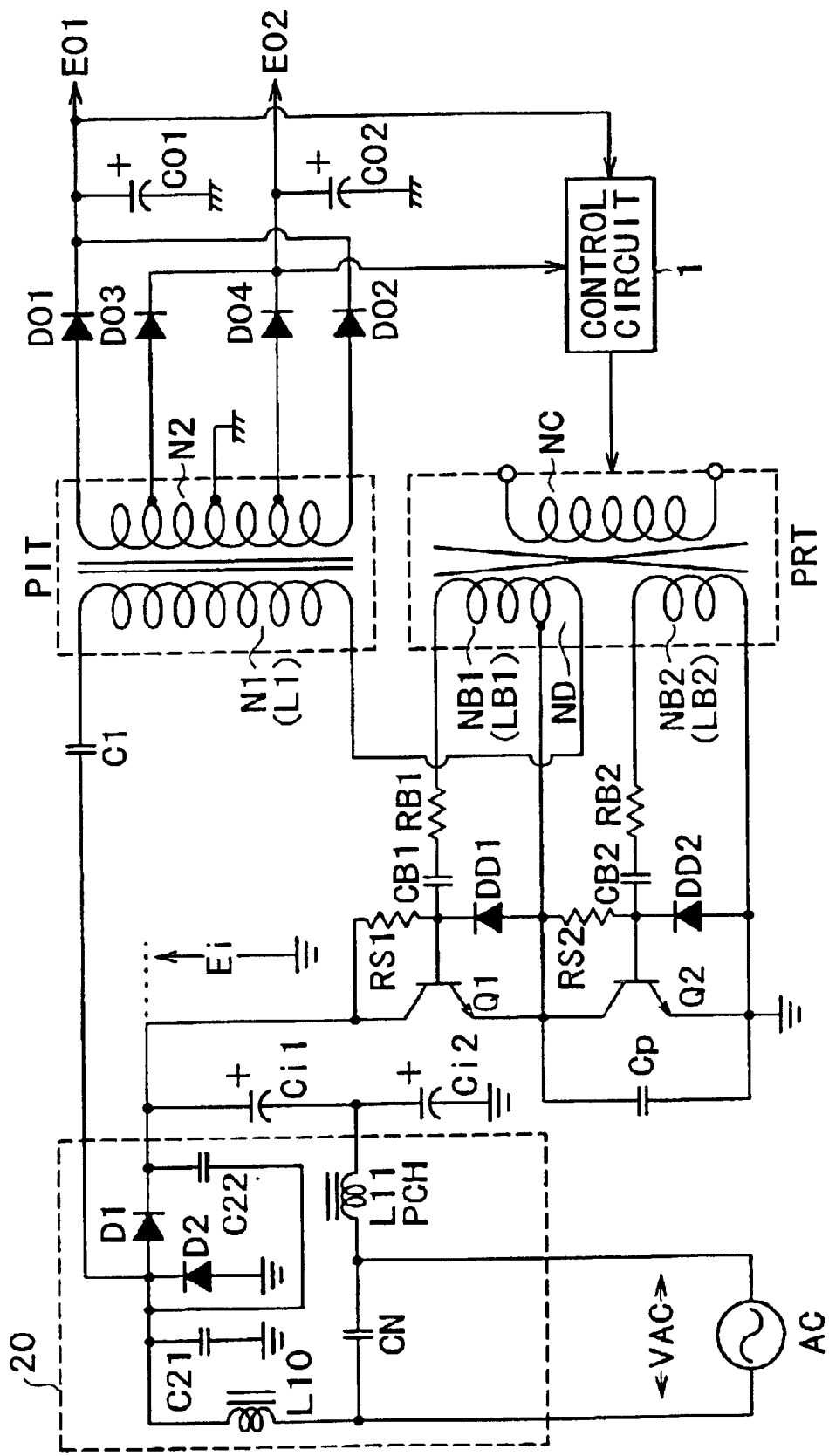
FIG. 11 is a circuit diagram showing a configuration of further another related-art power supply circuit.

The ripple voltage of the dc output voltage E01 can be restricted to a value substantially equal (60 mV) to that of the case of FIG. 11 which includes the power choke coil PCH.

Thus, in the switching power supply circuit of the embodiment of FIG. 1, while significant improvement of the power factor of a resonance converter which includes a combination of a current resonance type converter and a partial voltage resonance circuit is achieved, the necessity for such a power choke coil PCH as described hereinabove with reference to FIG. 11 as a countermeasure against a ripple voltage is eliminated. Further, by a resulting rise of the dc input voltage Ei, the AC to DC power conversion efficiency ($\eta$AC/DC) can be improved.

Further, the power factor improving circuit realized exhibits a reduced variation of the power factor with respect to a variation of the ac input power or the load power.

Further, in the power factor improving rectification circuit 10 having the configuration of FIG. 1, the total weight of the components is approximately 22 g, and the mounting area can be reduced to 9 cm². In short, when compared with the power choke coil PCH, the weight can be reduced to ⅟₁₁ and the mounting area can be reduced to ½. Consequently, reduction in cost, size and weight of the circuit can be realized.

Further, if the inductor L10 is formed from a ferrite core of a closed magnetic path, then an influence of leakage magnetic fluxes can be eliminated.

Furthermore, there is an advantage also in that also the tertiary winding N3 of the isolation converter transformer PIT may have a small number of turns, that is, 4 T.

Second Embodiment

Figure 4:
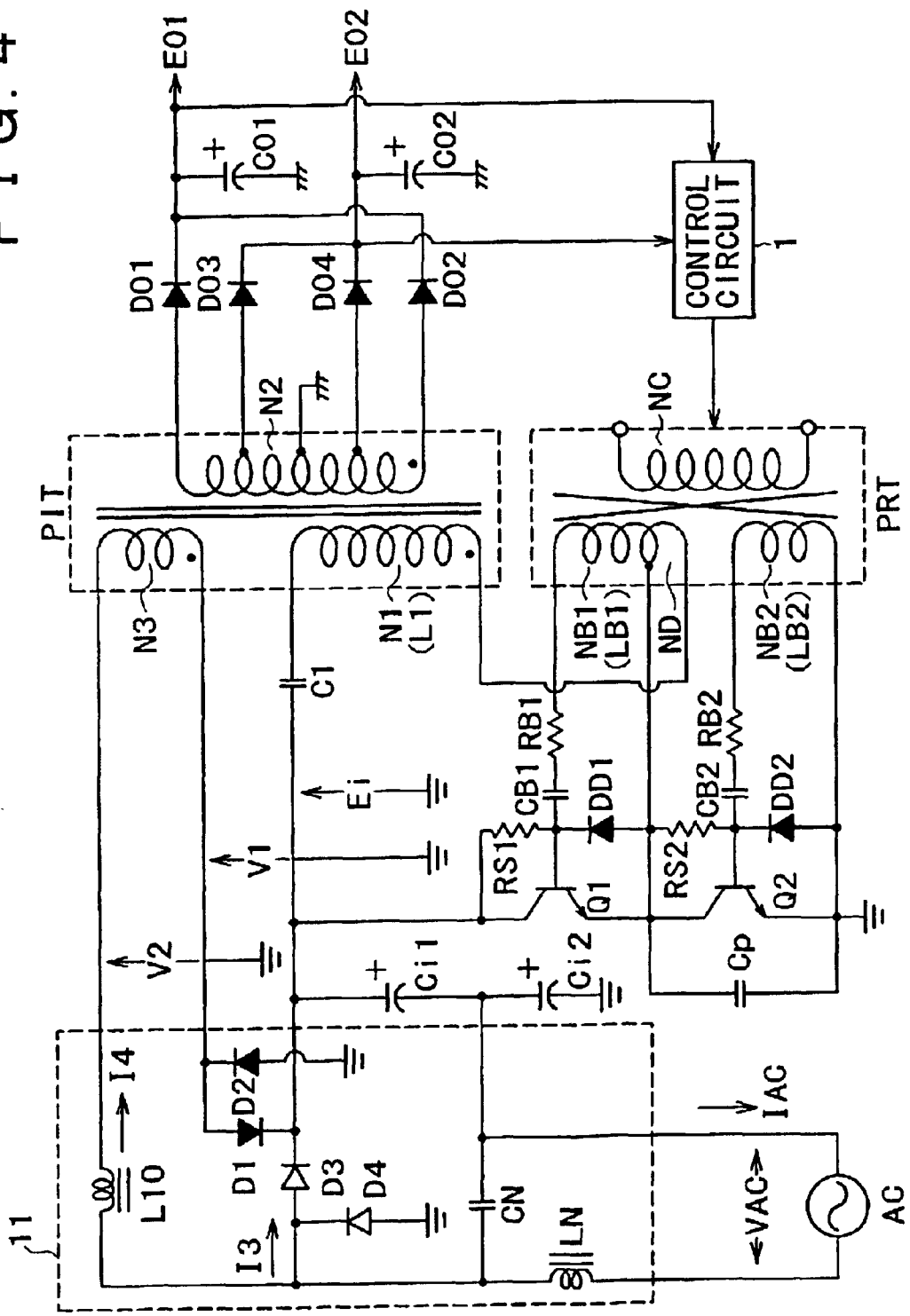
FIG. 4 is a circuit diagram showing a configuration of a switching power supply circuit of a second embodiment according to the present invention.

FIG. 4 shows a switching power supply circuit of a second embodiment according to the present invention.

Referring to FIG. 4, also the power supply circuit shown includes a converter circuit which includes a combination of a half bridge coupling current resonance type converter and a partial voltage resonance circuit with which voltage resonance occurs only upon turning off of a semiconductor switch. The power supply circuit further includes a power factor improving rectification circuit 11 for improving the power factor of the converter circuit.

It is to be noted that the configuration of the power supply circuit of FIG. 4 is similar to that described hereinabove with reference to FIG. 1 except the power factor improving rectification circuit 11, and overlapping description of the common components is omitted herein to avoid redundancy.

Also the power factor improving rectification circuit 11 in the power supply circuit of FIG. 4 has a rectification action for ac input current IAC and has a power factor improving action for the ac input current IAC.

In the power factor improving rectification circuit 11, a filter for normal mode noise suppression is formed from a capacitor CN and an inductor LN for one of ac lines.

A choke coil (inductor L10) is connected in series to the filter for normal mode noise suppression.

Further, two high speed recovery type diodes D1 and D2 connected in series are provided. The series connection of the high speed recovery type diodes D1 and D2 is disposed between the positive terminal of the smoothing capacitor Ci1 and the primary side ground.

The choke coil (inductor L10) is connected to a winding terminating end of the tertiary winding N3 of the isolation converter transformer PIT while a winding starting end of the tertiary winding N3 is connected to the node between the high speed recovery type diodes D1 and D2.

Further, low speed recovery type diodes D3 and D4 are connected in series and disposed between the positive terminal of the smoothing capacitor Ci1 and the primary side ground. A node between the low speed recovery type diodes D3 and D4 is connected to the ac line through the filter for the normal mode noise suppression.

In the power factor improving rectification circuit 11 having the configuration described above, the high speed recovery type diodes D1 and D2 function as a first rectification circuit, and the low speed recovery type diodes D3 and D4 function as a second rectification circuit.

In particular, within a period within which the ac input voltage VAC is positive, rectified current by the first rectification circuit flows along the ac power supply AC→normal mode noise suppressing filter (LN, CN)→inductor L10→tertiary winding N3→high speed recovery type diode D1→smoothing capacitor Ci1→. . . , whereby the smoothing capacitor Ci1 is charged. Simultaneously, rectified current by the second rectification circuit flows along the ac power supply AC→normal mode noise suppressing filter (LN, CN)→low speed recovery type diode D3→smoothing capacitor Ci1→ . . . , whereby the smoothing capacitor Ci1 is charged.

On the other hand, within another period within which the ac input voltage VAC is negative, rectified current by the first rectification circuit flows along the ac power supply AC→smoothing capacitor Ci2→primary side ground→high speed recovery type diode D2→ . . . , whereby the smoothing capacitor Ci2 is charged. Simultaneously, rectified current by the second rectification circuit flows along the ac power supply AC→smoothing capacitor Ci2→primary side ground→low speed recovery type diode D4→. . . , whereby the smoothing capacitor Ci2 is charged.

In short, rectified current is supplied separately from different systems to the smoothing capacitors Ci1 and Ci2 by the first and second rectification circuits.

Further, since the smoothing capacitors Ci1 and Ci2 are connected in series and the rectified smoothed voltage Ei is extracted from the positive terminal side of the smoothing capacitor Ci1, a double voltage rectification system is achieved.

Figure 5:
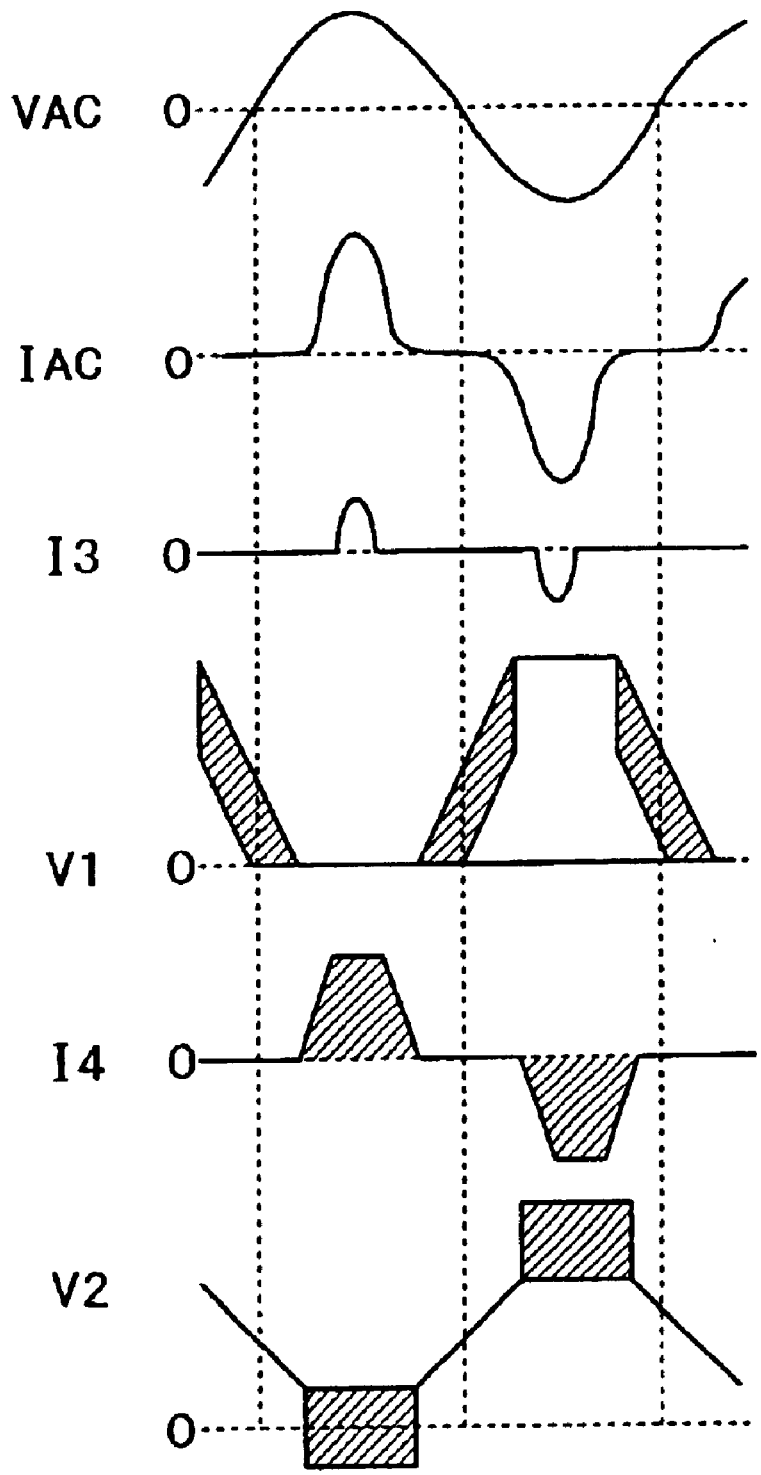
FIG. 5 is a waveform diagram illustrating operation of the switching power supply circuit of the second embodiment.

In this manner, charging current to the smoothing capacitors Ci1 and Ci2 is supplied separately by the operation of the first and second rectification circuits. In FIG. 5, the waveform of the current I3 flowing through the low speed recovery type diodes D3 and D4 is shown. The current I3 flows only around positive and negative peak values of the ac input voltage VAC.

Consequently, excessive charging current is prevented from flowing through the high speed recovery type diode D1 or D2 around positive and negative peak values of the ac input voltage VAC. In particular, around positive and negative peak values of the ac input voltage VAC, current I3 flows through the low speed recovery type diodes D3 and D4 while only current I4 of a high frequency flows through the high speed recovery type diodes D1 and D2. Therefore, the power loss by the high speed recovery type diodes D1 and D2 decreases, and consequently, a higher efficiency can be achieved.

The power factor improving rectification circuit 11 has the following power factor improving function.

As described above, the power factor improving rectification circuit 11 is configured such that the normal mode noise suppressing filter (LN, CN) is connected to the node between the high speed recovery type diodes D1 and D2 through the series connection of the inductor L10 and the tertiary winding N3.

The voltage induced in the tertiary winding N3 is induced based on a switching operation of the primary side current resonance converter and is a pulse voltage of a rectangular waveform which increases in proportion to the winding number ratio (N3/N1) between the tertiary winding N3 and the primary winding N1. This pulse voltage V2 is fed back and current I4 flows through the high speed recovery type diodes D1 and D2 when the absolute value of the ac input voltage VAC is higher than ½ of a peak value as seen in FIG. 5.

Within a period within which the ac input voltage VAC is positive, the current I4 flows along the capacitor CN→inductor L10→tertiary winding N3→high speed recovery type diode D1→smoothing capacitor Ci1 to cause the high speed recovery type diode D1 to perform a switching operation.

Within another period within which the ac input voltage VAC is negative, the current I4 flows along the capacitor CN→smoothing capacitor Ci1→smoothing capacitor Ci2→high speed recovery type diode D2 to cause the high speed recovery type diode D2 to perform a switching operation.

Since the current I4 is used to cause the high speed recovery type diodes D1 and D2 to perform a switching operation when the absolute value of the ac input voltage VAC is higher than ½ of a peak value, charging current flows to the smoothing capacitor Ci1 (or smoothing capacitor Ci2) also within a period within which the rectification output voltage level is lower than the voltage across the smoothing capacitor Ci1 (or Ci2).

As a result, an average waveform of the ac input current approaches the waveform of the ac input voltage and increases the continuity angle of the ac input current, and consequently, improvement of the power factor is achieved.

Figure 6:
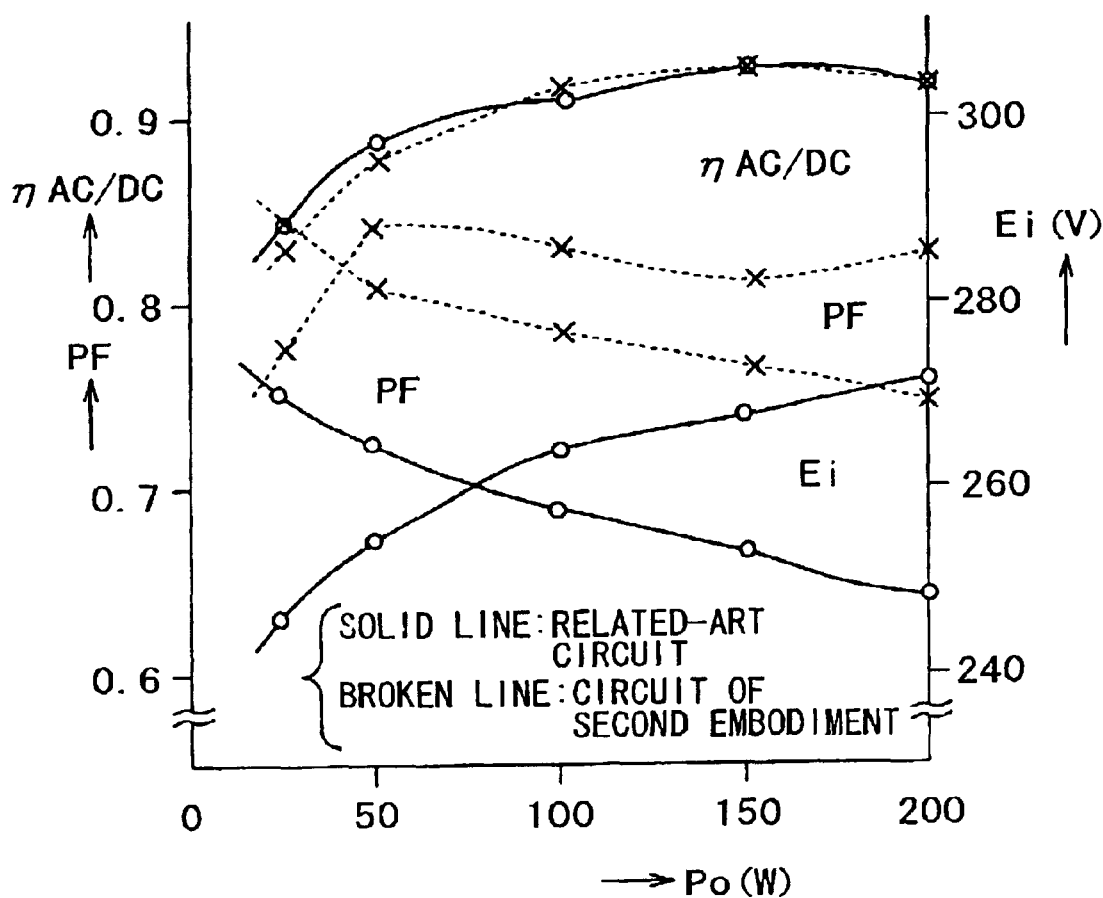
FIG. 6 is a diagram illustrating characteristics of the AC to DC conversion efficiency, power factor and dc input voltage of the switching power supply circuit of the second embodiment.

FIG. 6 illustrates variation characteristics of the AC to DC power conversion efficiency (ηAC/DC), power factor PF and double voltage rectified dc input voltage Ei and particularly illustrates such variations when the ac input voltage VAC is 100 V and the load power Po varies from 200 W to 25 W. It is to be noted that, in FIG. 6, broken line curves represent the characteristics by the circuit of FIG. 4 and solid line curves represent the characteristics by the related-art circuit described hereinabove with reference to FIG. 9 for comparison.

It is to be noted that, when the characteristics illustrated in FIG. 6 are obtained, the circuit of FIG. 4 has the following constants:

primary winding N1 of the isolation converter
transformer PIT=45 T (turns)
secondary winding N2 of the isolation converter
transformer PIT=45 T
tertiary winding N3 of the isolation converter
transformer PIT=13 T
inductor L10=92 $\mu$H
inductor LN=100 $\mu$H
series resonance capacitor C1=0.056 $\mu$F
capacitor CN=1 $\mu$F As can be seen from FIG. 6, in the circuit of FIG. 4, a power factor PF of 0.83 when the load power Po is 200 W is realized. Further, the power factor characteristic obtained exhibits a small variation with respect to a variation of the ac input voltage VAC.

The double voltage rectified dc input voltage Ei exhibits a rise of 22.2 V, and the AC to DC power conversion efficiency (ηAC/DC) exhibits a rise of 0.5% with respect to that of the related art. In this instance, the ac input power exhibits a decrease of 1.2 W, and therefore, saving of energy is achieved.

The ripple voltage of the dc output voltage E01 can be restricted to a value substantially equal (60 mV) to that of the case of FIG. 11 which includes the power choke coil PCH.

Thus, also in the switching power supply circuit of the embodiment of FIG. 4, while significant improvement of the power factor of a resonance converter which includes a combination of a current resonance type converter and a partial voltage resonance circuit is achieved, the necessity for such a power choke coil PCH as described hereinabove is eliminated. Further, by a resulting rise of the dc input voltage Ei, the AC to DC power conversion efficiency (ηAC/DC) can be improved.

Further, the power factor improving circuit realized exhibits a reduced variation of the power factor with respect to a variation of the ac input power or the load power.

Further, in the power factor improving rectification circuit 11 having the configuration of FIG. 4, the total weight of the components is approximately 25 g, and the mounting area can be reduced to 7 cm$^2$. In short, when compared with the power choke coil PCH, the weight can be reduced to 1/10 and the mounting area can be reduced to 1/2.7. Consequently, reduction in cost, size and weight of the circuit can be realized.

Further, if the inductor L10 is formed from a ferrite core of a closed magnetic path, then an influence of leakage magnetic fluxes can be eliminated.

Furthermore, since the power factor depends upon the winding number of the tertiary winding N3 of the isolation converter transformer PIT and the inductance value of the inductor L10, the power factor improving rectification circuit 11 can be designed readily.

Third Embodiment

Figure 7:
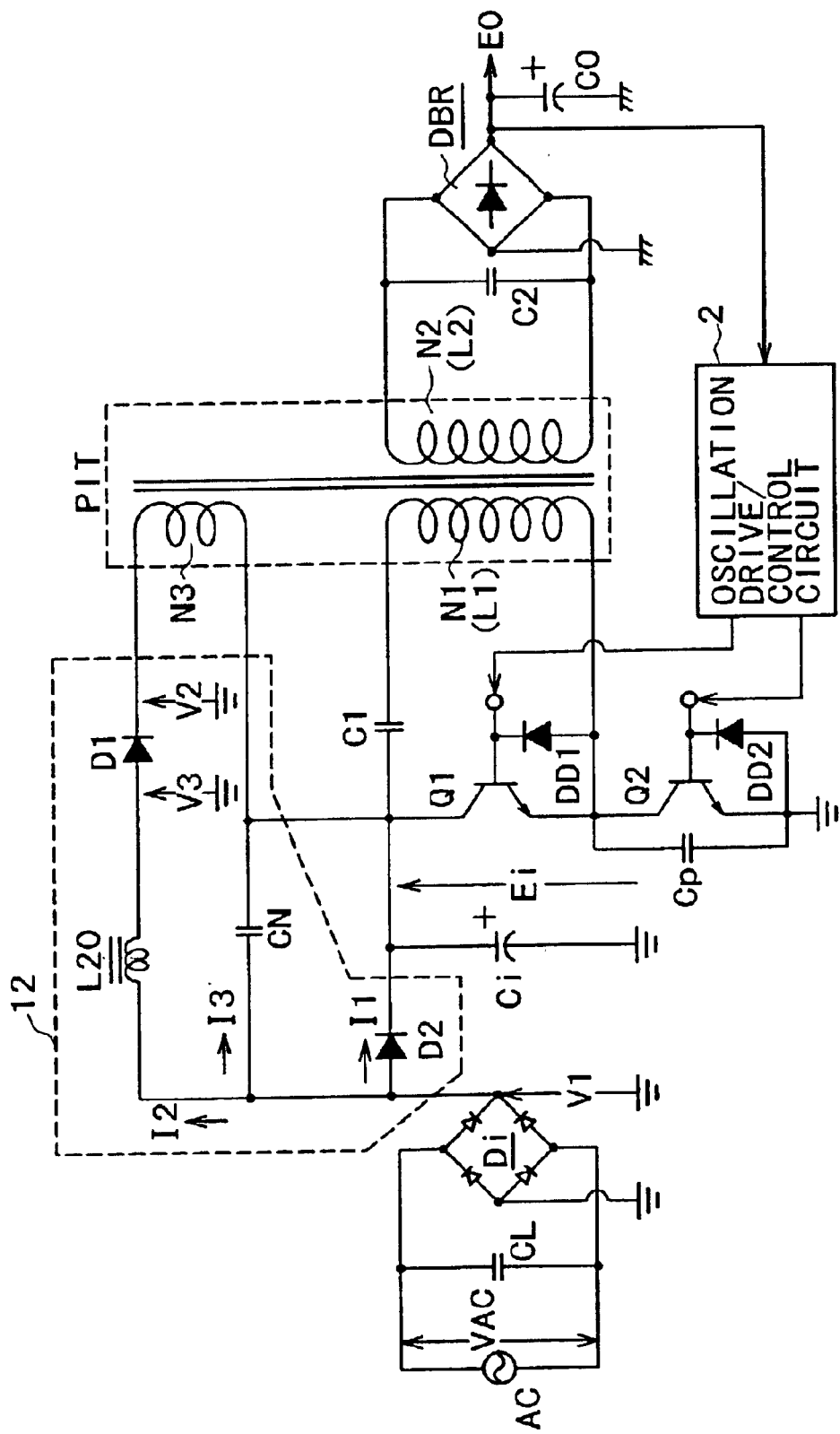
FIG. 7 is a circuit diagram showing a configuration of a switching power supply circuit of a third embodiment according to the present invention.

FIG. 7 shows an example of a configuration of a switching power supply circuit of a third embodiment according to the present invention. The power supply circuit shown in FIG. 7 is configured for conditions of the load power Po=200 W or more and the ac input voltage VAC=200 V type or conditions of the load power Po=150 W or less and the ac input voltage VAC=100 V type.

Referring to FIG. 7, in the power supply circuit shown, a bridge rectification circuit Di formed from four low speed recovery type rectification diodes is connected to lines for a commercial ac power supply AC. A filter capacitor CL for noise absorption is connected in parallel to the commercial ac power supply AC.

The positive output terminal of the bridge rectification circuit Di is connected to the positive terminal of a smoothing capacitor Ci through a high speed recovery type diode D2 which forms a power factor improving circuit 12 hereinafter described. Consequently, the smoothing capacitor Ci is charged with rectified current formed by a full-wave rectification operation of the bridge rectification circuit Di, and a rectified smoothed voltage Ei is obtained as a voltage across the smoothing capacitor Ci. The rectified smoothed voltage Ei has a level equal to that of the ac input voltage VAC. In other words, a dc input voltage is obtained by the equal voltage rectification circuit, and the dc input voltage is inputted to a current resonance type converter of the next stage.

A current resonance type converter of the half bridge coupling type which is separately excited to perform a separately excited switching operation is provided on the primary side of the power supply circuit shown in FIG. 7. The current resonance type converter includes two switching elements Q1 and Q2.

In this instance, an NPN bipolar junction transistor (BJT) is used for the switching elements Q1 and Q2. The collector of the switching element Q1 is connected to the positive terminal of the smoothing capacitor Ci, and the emitter of the switching element Q1 is connected to the collector of the switching element Q2. The emitter of the switching element Q2 is connected to the primary side ground. Thus, a half bridge connection is formed from a series connection of the switching elements Q1 and Q2 connected in parallel to the smoothing capacitor Ci in this manner.

A clamp diode DD1 is connected in parallel between the base and the emitter of the switching element Q1. More particularly, the anode of the clamp diode DD1 is connected to the emitter of the switching element Q1 while the cathode of the clamp diode DD1 is connected to the base of the switching element Q1. Another clamp diode DD2 is connected in parallel between the base and the emitter of the switching element Q2 in a similar manner.

Further, a partial resonance capacitor Cp is connected between the collector and the emitter of the switching element Q2 which is connected to the primary side ground. The partial resonance capacitor Cp is connected, for example, to a primary winding N1 of an isolation converter transformer PIT hereinafter described so that a parallel resonance circuit is formed from a capacitance of the partial resonance capacitor Cp and a leakage inductance L1 of the primary winding N1 of the isolation converter transformer PIT. The parallel resonance circuit provides a partial voltage resonance operation wherein it exhibits voltage resonance only upon turning off of the switching element Q2.

Drive signals from an oscillation drive/control circuit 2 are supplied to the bases of the switching elements Q1 and Q2. The switching elements Q1 and Q2 perform on/off switching operations alternately with a required switching frequency in accordance with the drive signals supplied thereto from the oscillation drive/control circuit 2.

One end of the primary winding N1 of the isolation converter transformer PIT is connected to the node between the emitter of the switching element Q1 and the collector of the switching element Q2. The other end of the primary winding N1 is connected to the collector of the switching element Q1 through a series resonance capacitor C1.

According to the connection scheme just described, a series connection circuit of the primary winding Ni and the series resonance capacitor C1 is formed first. Thus, a primary side series resonance circuit is formed from the leakage inductance L1 of the primary winding N1 and capacitance of the series resonance capacitor C1. The primary side series resonance circuit (N1-C1) is connected between the switching output points (collectors) of the switching elements Q1 and Q2.

Consequently, a switching output of the switching elements Q1 and Q2 is transmitted to the primary side series resonance circuit (N1-C1), and the switching operations of the switching elements Q1 and Q2 are made switching operations of the current resonance type by the resonance operation of the primary side series resonance circuit (N1-C1).

The isolation converter transformer PIT is provided to transmit a switching output obtained at the primary winding N1 to the secondary side.

In the present embodiment, the isolation converter transformer PIT includes, for example, an EE type core having a central magnetic leg on which the primary winding N1 and a secondary winding N2 are wound in an isolated relationship from each other.

Further, in the present embodiment, no gap is formed in the magnetic legs of the EE type core. Consequently, the coupling coefficient k between the primary winding N1 and the secondary winding N2 is set to, for example, k=approximately 0.9. While, in the isolation converter transformer PIT of the circuit described as the related-art circuit with reference to FIG. 9, a gap is formed in the central magnetic leg of the EE type core so that a coupling degree of a coupling coefficient k of k=approximately 0.8 is obtained, in the present embodiment, a higher coupling degree is obtained.

Further, in the present embodiment, a secondary side partial resonance capacitor C2 is connected in parallel to the secondary winding N2 of the isolation converter transformer PIT. Thanks to the provision of the secondary side partial resonance capacitor C2, a partial voltage resonance operation is obtained on the secondary side, for example, upon a switching operation of a rectification diode which forms a rectification circuit of the secondary side.

A full-wave rectification circuit formed from a bridge rectification circuit DBR and a smoothing capacitor C0 as seen in FIG. 7 is provided for the secondary winding N2. The full-wave rectification circuit rectifies and smoothes an alternating voltage excited in the secondary winding N2 so that a secondary side dc output voltage E0 is obtained as a voltage across the smoothing capacitor C0.

The secondary side dc output voltage E0 is supplied as a dc power supply to a load not shown. The secondary side dc output voltage E0 is branched and inputted also to the oscillation drive/control circuit 2.

The oscillation drive/control circuit 2 detects the level of the secondary side dc output voltage E0 inputted thereto. Further, the oscillation drive/control circuit 2 outputs drive signals in response to the thus detected level so that the switching frequency of the switching elements Q1 and Q2 may be varied.

When the switching frequency varies in this manner, the resonance impedance of the primary side series resonance circuit varies, and also the energy to be transmitted from the primary side to the secondary side in the isolation converter transformer PIT varies. Therefore, also the level of the secondary side dc output voltage E0 is variably controlled. In short, the secondary side dc output voltage E0 is varied by variably controlling the switching frequency thereby to achieve constant voltage control.

Now, the power factor improving circuit 12 provided in the power supply circuit shown in FIG. 7 is described.

The power factor improving circuit 12 includes a high speed recovery type diode D1, an inductor L20, a filter capacitor CN and another high speed recovery type diode D2.

The inductor L20 and the high speed recovery type diode D1 are connected in series to a tertiary winding N3 of the isolation converter transformer PIT. More particularly, the anode of the high speed recovery type diode D1 is connected to one end of the inductor L20 and the cathode of the high speed recovery type diode D1 is connected to one end of the tertiary winding N3. The other end of the inductor L20 is connected to the positive output terminal of the bridge rectification circuit Di. The other end of the tertiary winding N3 is connected to the positive terminal of the smoothing capacitor Ci.

In short, the power factor improving circuit 12 in the present embodiment is formed such that the series connection circuit of the inductor L20, high speed recovery type diode D1 and tertiary winding N3 is inserted in a rectified current path between the positive output terminal of the bridge rectification circuit Di and the positive terminal of the smoothing capacitor Ci.

Further, in the power factor improving circuit 12, another high speed recovery type diode D2 is connected in parallel to the series connection circuit of the inductor L20, high speed recovery type diode D1 and tertiary winding N3. More particularly, the anode of the high speed recovery type diode D2 is connected to the inductor L20 side while the cathode of the high speed recovery type diode D2 is connected to the tertiary winding N3 side. Further, the filter capacitor CN for suppressing normal mode noise is connected in parallel to the series connection circuit of the inductor L20, high speed recovery type diode D1 and tertiary winding N3.

Operation of the power factor improving circuit 12 having such a configuration as described above is described below.

If it is assumed that an ac input voltage VAC is inputted to the power supply circuit, then a rectified output voltage V1 is obtained at the positive output terminal of the bridge rectification circuit Di. Rectified current obtained as a rectification output of the bridge rectification circuit Di is branched into and flows along three paths including a path wherein rectified current flows as current I1 through the high speed recovery type diode D1 into the smoothing capacitor Ci, another path wherein rectified current flows as current I2 through the inductor L20, high speed recovery type diode D1 and tertiary winding N3 into the smoothing capacitor Ci and a further path wherein rectified current flows through the filter capacitor CN into the smoothing capacitor Ci.

In this instance, since a switching output transmitted to the primary winding N1 is transmitted to and excites the tertiary winding N3, an alternating voltage V2 is generated in accordance with the switching period in the tertiary winding N3. Then, within a period within which an anode potential V3 of the high speed recovery type diode D1 is higher than the alternating voltage V2, the high speed recovery type diode D1 conducts to allow the current I2 described hereinabove to flow.

The voltage obtained by the tertiary winding N3 at this time is the alternating voltage V2 and has a period which depends on the switching frequency. Therefore, within a period within which the high speed recovery type diode D1 conducts to allow the current I2 to flow, the high speed recovery type diode D1 performs such a switching operation that it switches on and off in the switching period. Accordingly, the current I2 flows intermittently through the high speed recovery type diode D1 into the smoothing capacitor Ci.

In this manner, in the present embodiment, the high speed recovery type diode D1 which is a rectification diode is switched in response to the switching output voltage fed back from the tertiary winding N3 thereby to intermit the rectified current to flow through the high speed recovery type diode D1.

Consequently, also within a period within which the absolute value of the ac input voltage VAC is lower than the rectification smoothed voltage, charging current to the smoothing capacitor Ci flows.

As a result, an average waveform of the ac input current IAC approaches a waveform (sine wave) of the ac input voltage and increases the continuity angle of the ac input current thereby to achieve improvement of the power factor.

Figure 8:
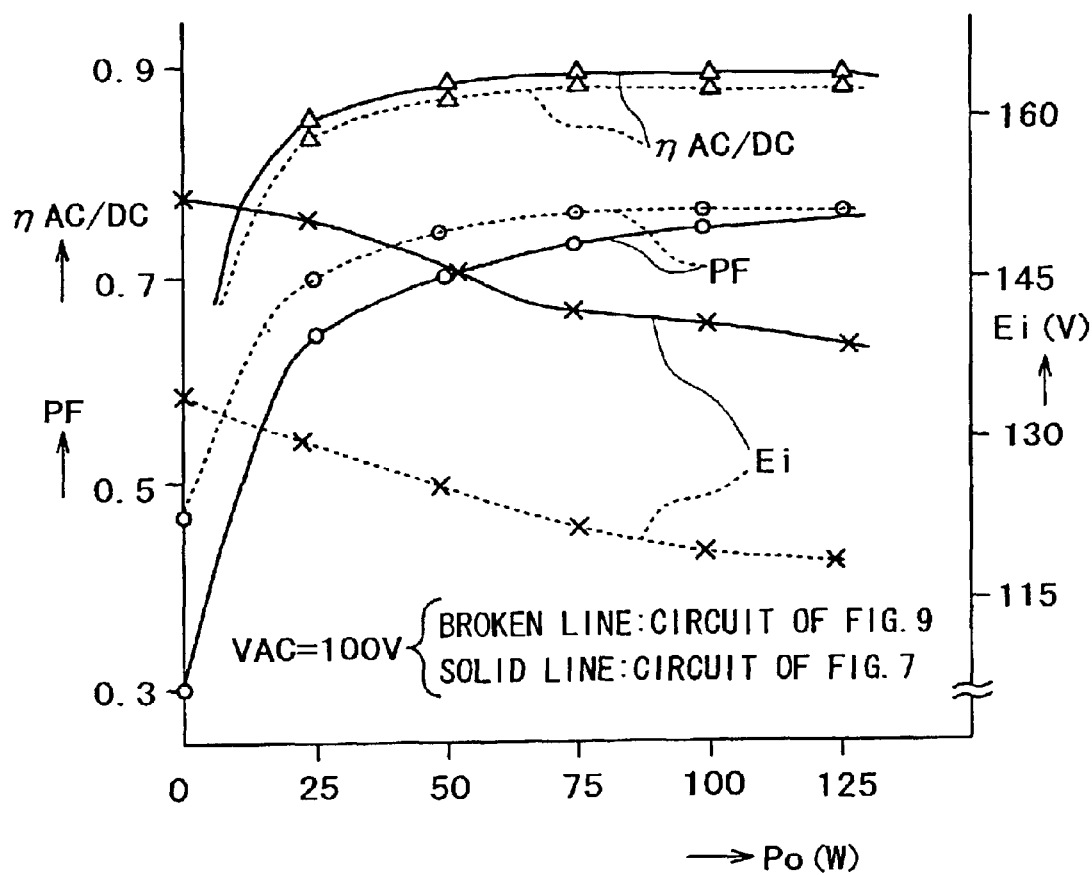
FIG. 8 is a diagram illustrating characteristics of the AC to DC conversion efficiency, power factor and dc input voltage of the switching power supply circuit of the third embodiment.

FIG. 8 illustrates characteristics of the power supply circuit having the configuration described above with reference to FIG. 7 and particularly illustrates variations of the AC to DC power conversion efficiency ($\eta AC/DC$), power factor PF and rectified smoothed voltage Ei when the ac input voltage VAC is fixed to 100 V and the load power Po varies from 0 to 125 W.

For reference, several constants of the circuit shown in FIG. 7 when the result of the experiment illustrated in FIG. 8 are obtained are given below:
 primary winding N1=23 T (turns)
 secondary winding N2=45 T
 tertiary winding N3=6 T
 gap length $G_{ap}$ of the isolation converter transformer PIT=0
 primary side series resonance capacitor C1=0.18 $\mu$F
 primary side partial resonance capacitor Cp=680 pF
 secondary side partial resonance capacitor C2=2,200 pF
 inductor L20=20 $\mu$H From FIG. 8, it can be seen that, with the circuit shown in FIG. 7, the level of the rectified smoothed voltage Ei is high irrespective of a variation of any of the load power Po and the ac input voltage VAC. This arises from the fact that the power choke coil PCH is not inserted in a line for the commercial ac power supply AC.

Further, it can be seen that, since the power choke coil PCH is not provided, the circuit of FIG. 7 exhibits improvement in the AC to DC power conversion efficiency ($\eta AC/DC$) irrespective of a variation of any of the load power Po and the ac input voltage VAC.

Further, as regards the power factor PF, a substantially equal result is osbtained in the condition of the load power Po=125 W.

Thus, it can be recognized that, with the power supply circuit of the third embodiment, improvement of the power conversion efficiency is achieved while a power factor which satisfies the power supply harmonic regulations is obtained in this manner.

Figure 9:
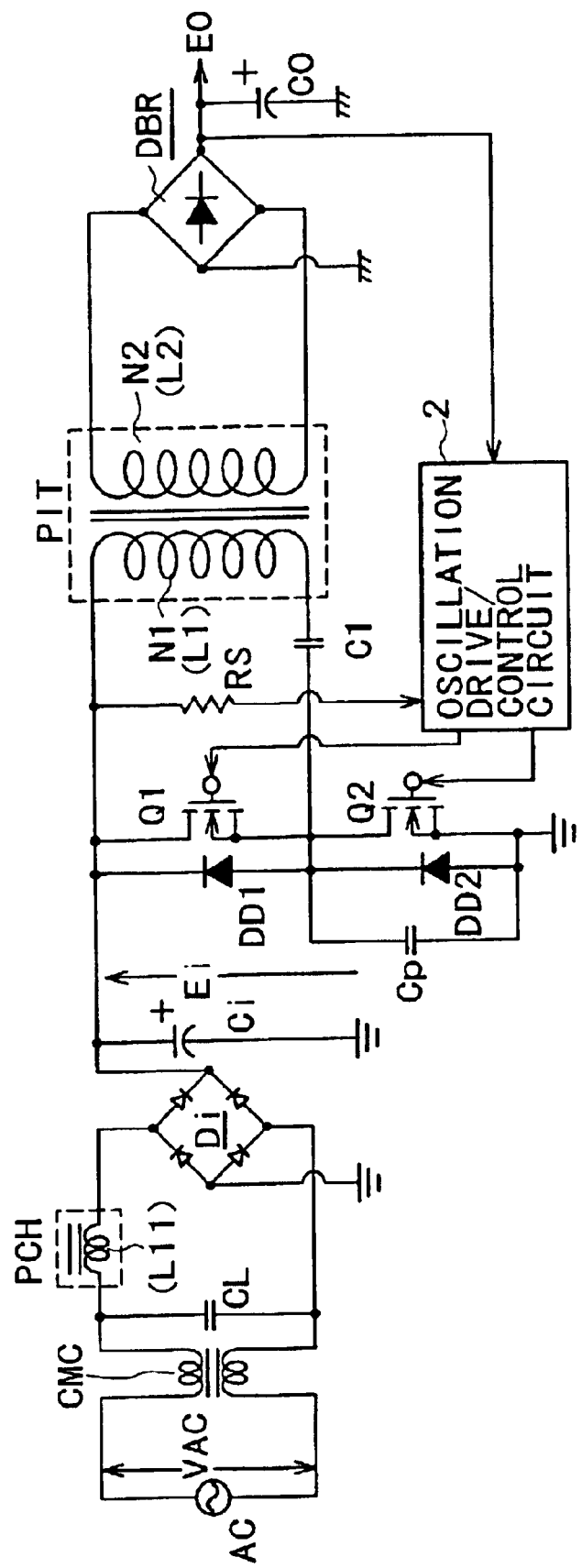
FIG. 9 is a circuit diagram showing a configuration of a related-art power supply circuit.

More particularly, for example, where the power supply circuit is configured such that no gap is formed in the isolation converter transformer PIT and it is formed as a composite resonance type converter which includes a partial resonance circuit also on the secondary side, the AC to DC power conversion efficiency exhibits an increase of 1.4%. Further, since the power factor improving circuit 12 which employs a voltage feedback system is used for improvement of the power factor, the AC to DC power conversion efficiency exhibits an increase of 1.7%. Consequently, a total increase of 3.1% is achieved. In particular, while the AC to DC conversion efficiency $\eta AC/DC$ of the circuit shown in FIG. 9 is $\eta AC/DC$=89.2%, with the power supply circuit of the third embodiment, the AC to DC power conversion efficiency is improved up to $\eta AC/DC$=91.2% by the change of the configuration of the composite resonance converter, and is further improved up to $\eta AC/DC$=92.3% by the combination of the power factor improving circuit 12 of the voltage feedback system.

Also a result of an examination that the ac input power exhibited a decrease of 4.6 W was obtained.

In the third embodiment, since the power choke coil PCH is eliminated, also the necessity for a magnetic shielding short ring for preventing leakage magnetic fluxes of such power choke coil PCH eliminated.

Similarly, since no gap is formed in the isolation converter transformer PIT to raise the coupling coefficient k between the primary winding N1 and the secondary winding N2 to k=approximately 0.9, also leakage magnetic fluxes from the isolation converter transformer PIT can be reduced. Therefore, there is no necessity to provide a short ring for the isolation converter transformer PIT either.

Consequently, reduction of the cost can be achieved when compared with the related-art power supply circuits described hereinabove. Further, reduction in size and weight of the circuitry can be promoted.

More particularly, in the circuit shown in FIG. 9, the power choke coil PCH adopted actually has a weight of approximately 135 g, and the mounting area of the circuit on a printed circuit board is 10.8 cm$^2$. In contrast, in the circuit shown in FIG. 7, the total weight of parts composing the power factor improving circuit 12 is approximately 15 g, and the mounting area is 6.0 cm$^2$. In short, the circuit shown in FIG. 7 has a weight ratio of 1/10 and a mounting area ratio of 1/1.8 to the circuit shown in FIG. 9. Thus, it can be seen that the circuit of FIG. 7 achieves significant reduction in weight and size.

While several embodiments have been described above, the present invention allows various modifications.

In particular, while, in the embodiments described above, a current resonance type converter of a half bridge coupling scheme including bipolar transistors is described as an example, the present invention can be applied also to a current resonance type converter wherein, for example, such MOS-FETs as shown in FIG. 9 or IGBTs are coupled in a half bridge coupling scheme.

Further, a drive circuit for two switching elements may not necessarily be a self-excited oscillation drive circuit but may be a separately excited oscillation drive circuit.

Furthermore, the configuration of the rectification smoothing circuit on the secondary side of the isolation converter transformer PIT is not limited to that shown in FIG. 1, 4 or 7, but may be any configuration only if a required dc output voltage is obtained therefrom.

While preferred embodiments of the present invention have been described using specific terms, such description is for illustrative purposes only, and it is to be understood that changes and variations may be made without departing from the spirit or scope of the following claims.

Figure 10:
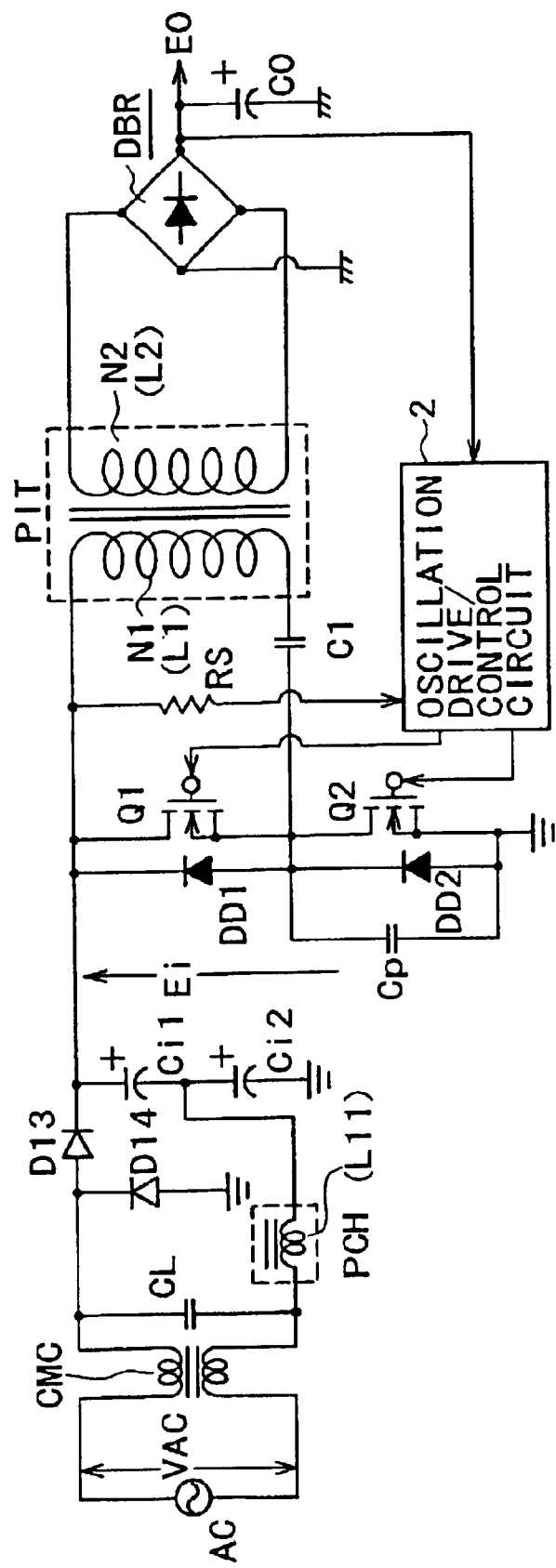
FIG. 10 is a circuit diagram showing a configuration of another related-art power supply circuit.
Figure 12:
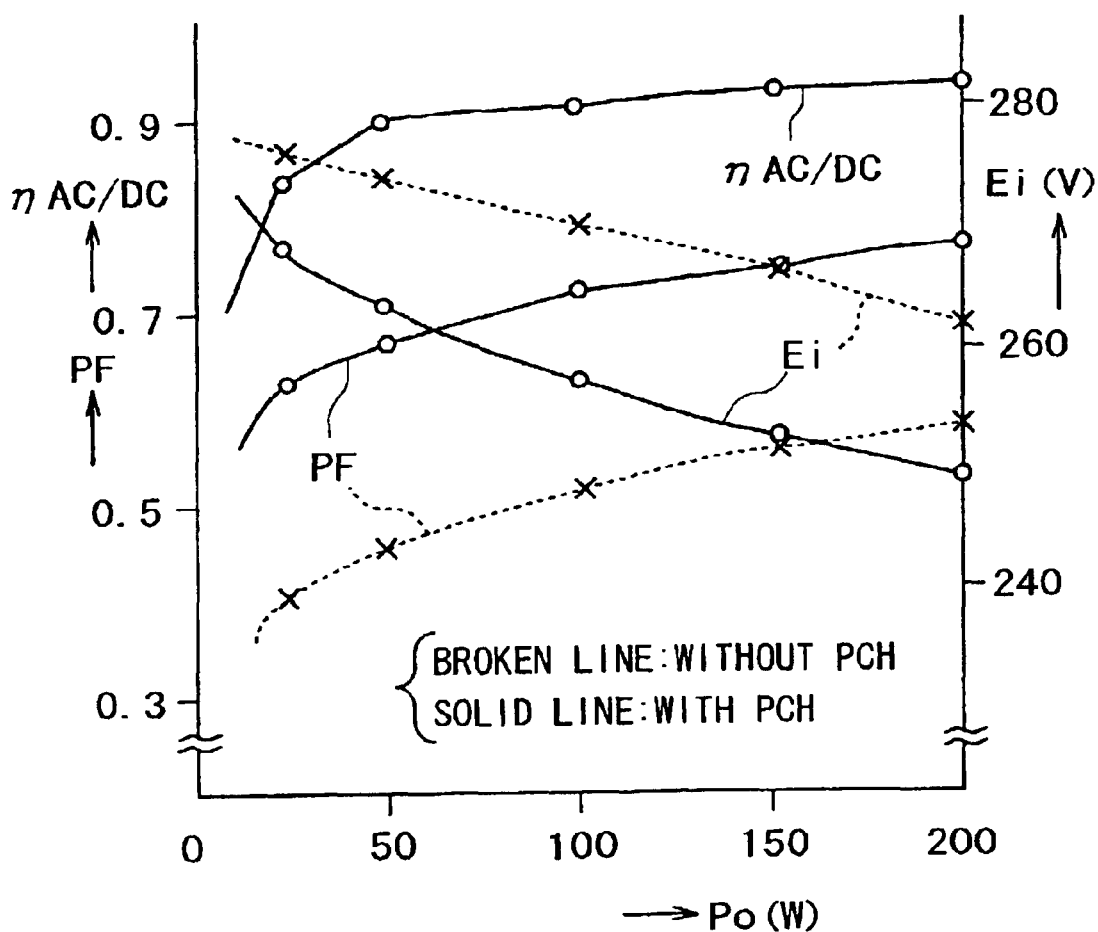
FIG. 12 is a diagram illustrating characteristics of the AC to DC conversion efficiency, power factor and dc input voltage of the related-art power supply circuit of FIG. 11.

FIG. 1
1: Control circuit
FIG. 3, from above
Solid line: related-art circuit
Broken line: circuit of first embodiment
FIG. 4
1: Control circuit
FIG. 6, from above
Solid line: related-art circuit
Broken line: circuit of second embodiment
FIG. 7
2: Oscillation drive/control circuit
FIG. 8, from above
Broken line: circuit of FIG. 9
Solid line: circuit of FIG. 7
FIG. 9
2: Oscillation drive/control circuit
FIG. 10
23: Oscillation drive/control circuit
FIG. 11
1: Control circuit
FIG. 12
Broken line: without PCH
Solid line: with PCH
FIG. 13
Gap

What is claimed is:

1. A switching power supply circuit comprising:
   rectification smoothing means including a rectifier and a smoothing capacitor connected in series for rectifying and smoothing an ac voltage supplied through two lines for an ac power supply;
   an isolation converter transformer including a core and a primary winding, a secondary winding, and tertiary winding wound on said core for transmitting an output on a primary side obtained by said primary winding to a secondary side wherein said secondary winding is wound, said tertiary winding being provided on said primary side;
   switching means including two switching elements in a half-bridge coupling configuration for intermittently outputting an output voltage of said rectification smoothing means to said primary winding of said isolation converter transformer;
   switching driving means for driving said two switching elements to perform a switching operation;
   a current resonance circuit formed from a leakage inductance component of said primary winding of said isolation converter transformer and a capacitance of a series resonance capacitor connected in series to said primary winding for making an operation of said switching means an operation of a current resonance type;
   a partial voltage resonance circuit formed from a capacitance of a parallel resonance capacitor connected in parallel to one of said two switching elements and a leakage inductance component of said primary winding of said isolation converter transformer for performing a voltage resonance operation within a turnoff period of each of said two switching elements; and
   dc output voltage production means for receiving and rectifying an alternating voltage obtained by said secondary winding of said isolation converter transformer to produce a secondary side dc output voltage,
   wherein said tertiary winding is connected between one of said two lines for the ac power supply and said smoothing capacitor.

2. The switching power supply circuit according to claim 1, further comprising a normal-mode noise filter connected between said two lines for the ac power supply.

3. The switching power supply circuit according to claim 1, further comprising constant voltage controlling means for controlling said switching driving means in response to a level of the secondary side dc output voltage to vary a switching frequency of said switching means to perform constant voltage control for the secondary side dc output voltage.

4. The switching power supply circuit according to claim 1, wherein a gap of a predetermined distance is formed between legs of said core of said isolation converter transformer.

5. The switching power supply circuit according to claim 1, wherein said tertiary winding is connected to said smoothing capacitor through a high-speed recovery type diode.

6. A switching power supply circuit comprising:
   a rectification smoothing circuit including a voltage rectifier for rectifying ac current and a smoothing capacitor for smoothing rectified current from said voltage rectifier;
   an isolation converter transformer including a core and a primary winding, a secondary winding, and tertiary winding wound on said core for transmitting an output on a primary side obtained by said primary winding to a secondary side wherein said secondary winding is wound;
   switching means including two switching elements in a half-bridge coupling configuration for intermittently outputting an output voltage of said rectification smoothing circuit to said primary winding of said isolation converter transformer;
   switching driving means for driving said switching elements to perform a switching operation;
   a primary side series resonance circuit formed from a leakage inductance component of said primary winding of said isolation converter transformer and a capacitance of a primary side series resonance capacitor connected in series to said primary winding for making the operation of said switching means operation of the resonance type;
   a partial voltage resonance circuit formed from a capacitance of a primary side partial resonance capacitor connected in parallel to one of said switching elements and a leakage inductance component of said primary winding of said isolation converter transformer for performing a voltage resonance operation within a turnoff period of each of said two switching elements;
   a power factor improving circuit including a first high-speed recovery type diode element connected between said voltage rectifier and said smoothing capacitor, a series connection circuit of said tertiary winding and a second high-speed recovery type diode element connected in parallel with said first high-speed recovery type diode element; and dc output voltage production means for receiving and rectifying an alternating voltage obtained by said secondary winding of said isolation converter transformer to produce a secondary side dc output voltage.

7. The switching power supply circuit according to claim 6, further comprising a secondary side partial voltage resonance capacitor connected in parallel to said secondary winding of said isolation converter transformer.

8. The switching power supply circuit according to claim 6, further comprising constant voltage controlling means for controlling said switching driving means in response to a level of the secondary side dc output voltage to vary a switching frequency of said switching means, so as to perform constant voltage control for the secondary side dc output voltage.

9. The switching power supply circuit according to claim 6, wherein a gap of a predetermined distance is formed between legs of said core of said isolation converter transformer.

* * * * *